250/201

United States Patent

Adler

[15] 3,643,018

[45] Feb. 15, 1972

[54] ALIGNMENT SYSTEM USING AN ELECTRONIC SCANNER

[72] Inventor: Alan J. Adler, Palo Alto, Calif.

[73] Assignee: Texas Instruments Incorporated, Dallas, Tex.

[22] Filed: July 6, 1970

[21] Appl. No.: 56,126

Related U.S. Application Data

[63] Continuation of Ser. No. 564,917, July 13, 1966, abandoned.

[52] U.S. Cl. ................................178/6.8, 250/222, 356/167
[51] Int. Cl. ........................................H04n 3/28, H04n 7/18
[58] Field of Search...............178/61 ND, 6.8; 250/222, 221; 356/167, 164, 166, 168, 156, 171, 172

[56] References Cited

UNITED STATES PATENTS 3,207,904 9/1965 Heinz....................................250/222
2,964,642 12/1960 Hobrough.............................356/167

FOREIGN PATENTS OR APPLICATIONS 845,296 8/1960 Great Britain ....................178/61 ND

*Primary Examiner*—Robert L. Griffin
*Assistant Examiner*—Joseph A. Orsino, Jr.
*Attorney*—Samuel M. Mims, Jr., James O. Dixon, Andrew M. Hassell, Harold Levine, Melvin Sharp, Gerald B. Epstein and John E. Vandigriff

[57] ABSTRACT

There is disclosed a method and apparatus for aligning a semiconductor device at a work station for the purpose of bonding lead wires thereto. The semiconductor device is scanned by the optical beam from a flying spot tube while simultaneously scanning a reference standard. As the semiconductor device or the work implement is moved to effect the desired alignment, the flying spot is zoomed to increase its magnification and thereby effect more accurate alignment.

29 Claims, 10 Drawing Figures

INVENTOR
ALAN J. ADLER

BY

Stanley Bialos
ATTORNEY

INVENTOR
ALAN J. ADLER

BY

Stanley Bialos
ATTORNEY

INVENTOR
ALAN J. ADLER
BY
Stanley Bialos
ATTORNEY

INVENTOR.
ALAN J. ADLER

BY

Stanley Bialos
ATTORNEY

INVENTOR.
ALAN J. ADLER

BY

Stanley Bialos
ATTORNEY

.TOR.
ALAN J. ADLER
BY
Stanley Bialas
ATTORNEY

INVENTOR
ALAN J. ADLER
BY
Stanley Bialos
ATTORNEY

INVENTOR
ALAN J. ADLER
BY
Stanley Bialos
ATTORNEY

ALIGNMENT SYSTEM USING AN ELECTRONIC SCANNER

This application is a continuation of Ser. No. 564,917 now abandoned.

This invention relates to an alignment system and, more particularly, to a method of and apparatus for comparing an object scene with a reference standard and, in response to any misalignment or deviation therebetween from a predetermined orientation, correctively changing the relative disposition of the object scene and an implement employed in association therewith to effect a predetermined positional relationship therebetween.

There are a considerable number of environments in which the invention is useful and, accordingly, the particular character of the object scene may vary significantly from one environment to another in order to accommodate any special requirements thereof and, correspondingly, the implement used in association with the object scene may change with and be determined by each such environment. Similarly, the reference standard may vary from one application or environment to another. A specific example of an environmental use for the invention is in the manufacture of electronic components such as semiconductors (i.e., transistors, integrated circuits, etc.,); and in describing the invention in detail herein, reference will be made to its use in the manufacture of semiconductors and especially to the fabrication of transistor and integrated circuit components.

In the manufacture of such a semiconductor component, it is necessary to affix connector leads to the various elements or metallized connection areas thereof to enable the component to be electrically connected in a circuit with which it is to be utilized. The connection of such leads is a rather delicate procedure involving quite precise positioning of the lead wires with respect to the elements or connection areas of the component; and, because of the small physical size of the connection areas and of the lead wires therefor, the conventional assembly procedure of positioning the parts manually requires the use of a viewing microscope for enlarging the parts sufficiently to enable manual observation and positioning thereof.

Several mechanisms are commercially available for use in performing this assembly operation, and usually such mechanisms comprise a jig structure for holding the component, a support equipped with a lead wire feed element, a microscope through which the operator can observe the component and lead wire, and control means enabling the operator to align the lead wire with the appropriate point of connection (i.e., element or connection area) on the component and then to secure the lead wire thereto. Depending upon the particular mechanism used, the jig may be movable with respect to the wire feed element or vice versa.

The fabrication technique described is tedious, time consuming and expensive; and it is accordingly an object, among others, of the present invention to provide a system for comparing an object scene with a reference standard and for correctively altering as necessary the relative orientation of the object scene and an implement employed in association therewith to effect a predetermined positional relationship therebetween; and which system is adapted for use in the fabrication of electronic components such as transistors, integrated circuits and the like, and when used in such electronic environment is operative to effect alignment automatically between a metallized connection area on a semiconductor component and a lead wire therefor to enable the lead wire to be connected to the proper location along such semiconductor. Additional objects and advantages of the invention will become apparent as the specification develops.

An exemplary embodiment of the invention is illustrated in the accompanying drawings, in which.

GENERAL DESCRIPTION

Figures 1, 3:
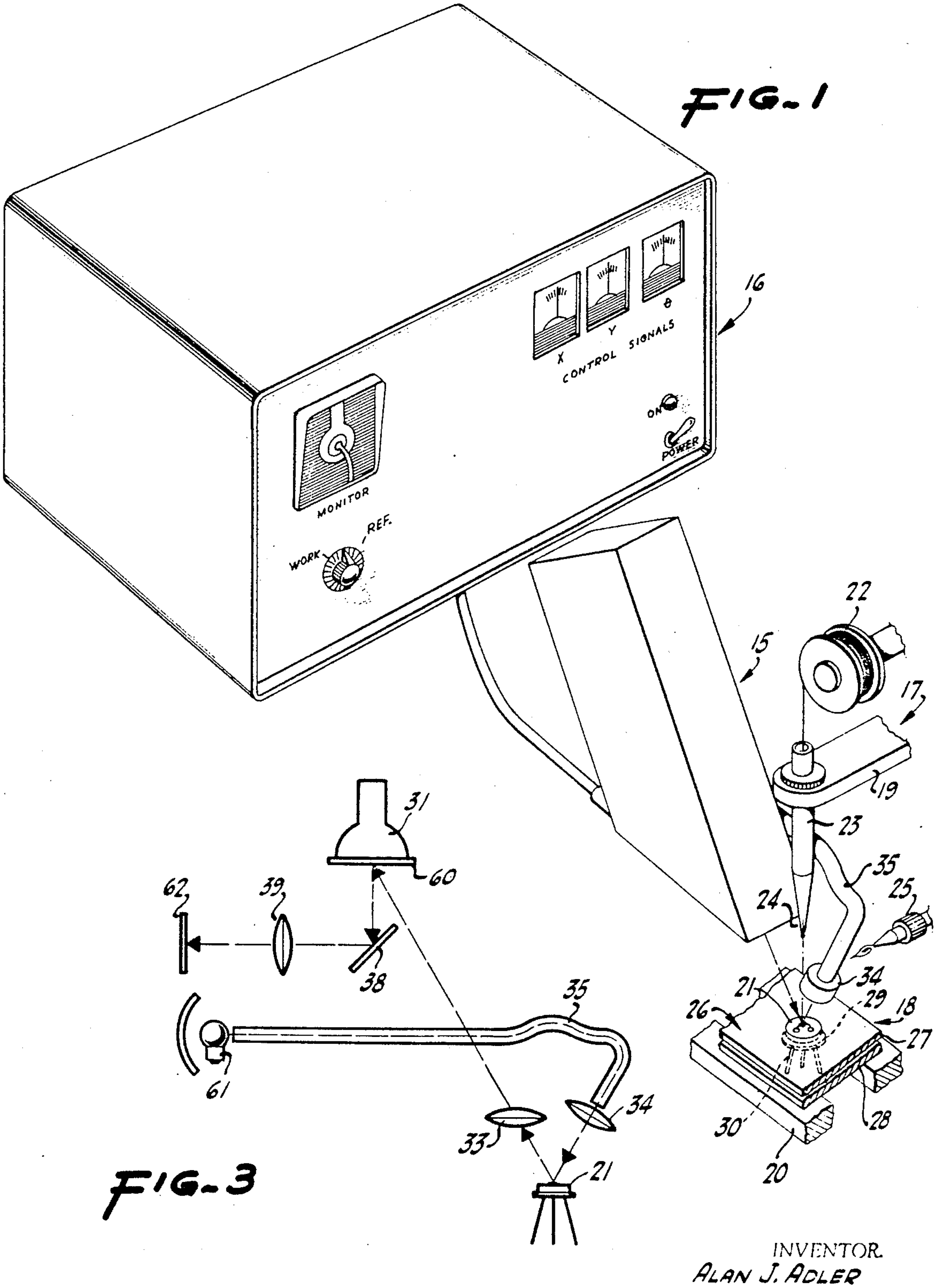
FIG. 1 is a perspective view depicting an apparatus embodying the invention adapted for use in connecting lead wires to transistors and other semiconductor components.
FIG. 3 is a partial diagrammatic view showing the system of FIG. 2 in an altered form in which it is employed to make a reference standard for subsequent use in the system.

The apparatus shown in FIG. 1 includes an inspection module 15, a control module 16, a lead bonder or lead-connector mechanism 17 and component-advancing mechanism 18. The lead-connector mechanism 17 and component-advancing mechanism 18 may constitute conventional equipment, and the connector-mechanism 17 deviates from the standard equipment only insofar as it is interconnected with and is responsive to the inspection and control modules 15 and 16. Accordingly, and by way of example, the connector mechanism 17 may be a lead bonder sold commercially by Kulicke and Soffa Manufacturing Company of Fort Washington, Pennsylvania, and is seen to be provided with a cantilever-type support arm 19 which is vertically movable by means (not shown) toward and away from a jig 20 for the purpose of securing lead wires to appropriate locations along a semiconductor component 21 in the form of a transistor supported upon the jig. The lead wire is supplied from a reel or spool 22 mounted above the support 19, and, upon demand, the lead wire is withdrawn from the spool and is advanced downwardly through a hollow tubular wire feeder or bonder member 23 carried by the arm 19 in depending relation therebelow.

In order to effect proper alignment of the tip 24 of the feeder 23 with the appropriate connection area along the semiconductor 21 so that the lead wire can be properly connected thereto, relative movement is afforded between the jig 20 and support 19; and in standard mechanism such relative movement is manually initiated and controlled by an operator observing the semiconductor 21 and tip 24 of the wire feeder through a microscope which has been omitted from the FIG. 1 illustration of the apparatus for purposes of simplicity since it is not required for operation of the present invention. The lead wire being advanced downwardly through the feeder 23 is cut off by a flame-type cutter 25 which severs the wire just below the tip of the feeder. Such cutting of the wire leaves a globule at the end thereof which is pressed into engagement with the aligned connection area during the next cycle of operation and forms the mechanical and electrical bond between the wire and such connection area. As stated heretofore, the mechanism 17 and the functions performed thereby, as described, are conventional; and it may be noted that there are other bonding mechanisms and bonding techniques, and the present invention is useful therewith so long as precise pOsitioning of the wire and semiconductor (i.e., proper connection area) is required.

Semiconductor components 21 are positioned on the jig 20 in any suitable manner, and an arrangement now employed in commercial operations (which is shown in FIG. 1) involves the use of a carrier 26 comprising two support strips 27 and 28 adapted to receive and confine a plurality of components 21 oriented in spaced-apart relation along the carrier. For this purpose, the upper strip 27 has a plurality of longitudinally spaced openings therealong, each of which has a component 21 projecting upwardly therethrough. Each component 21 has an enlarged flange 29 disposed beneath the strip 27 in overlying relation with the lower strip 28; and the lower strip has an opening therein which passes conductors 30 of the component downwardly therethrough. The carrier 26 advances each successive component 21 carried thereby to an appropriate location along the jig 20 at which a condition of alignment can be established between the component and tip 24 of the wire feeder 23. As heretofore stated, the carrier 26 and means for advancing the same are conventional and, per se, form no part of the present invention.

The inspection module 15 is mounted upon the support arm 19 and is therefore movable therewith vertically and also in horizontal directions in those mechanisms in which alignment is effected by displacing the wire feeder 23 with respect to the jig 20 and component 21 supported thereon. As will be described in detail hereinafter, the inspection module 15 contains means for illuminating the object scene defined in the present instance by a component 21, and it also contains means for receiving light reflected by the component as a consequence of such illumination thereof. Electrical signals are developed from the reflected light, and positional information present in such signals concerning the component 21 is correlated with similar positional informatiOn derived from a reference standard to obtain error information concerning any misalignment as between the component 21 and an implement associated therewith, which implement is defined in the system being considered by the wire feeder 23. Correction signals are developed from such error information, and the correction signals are fed to the mechanism 17 to effect a condition of proper alignment as between the component 21 and wire feeder 23.

Figure 2:
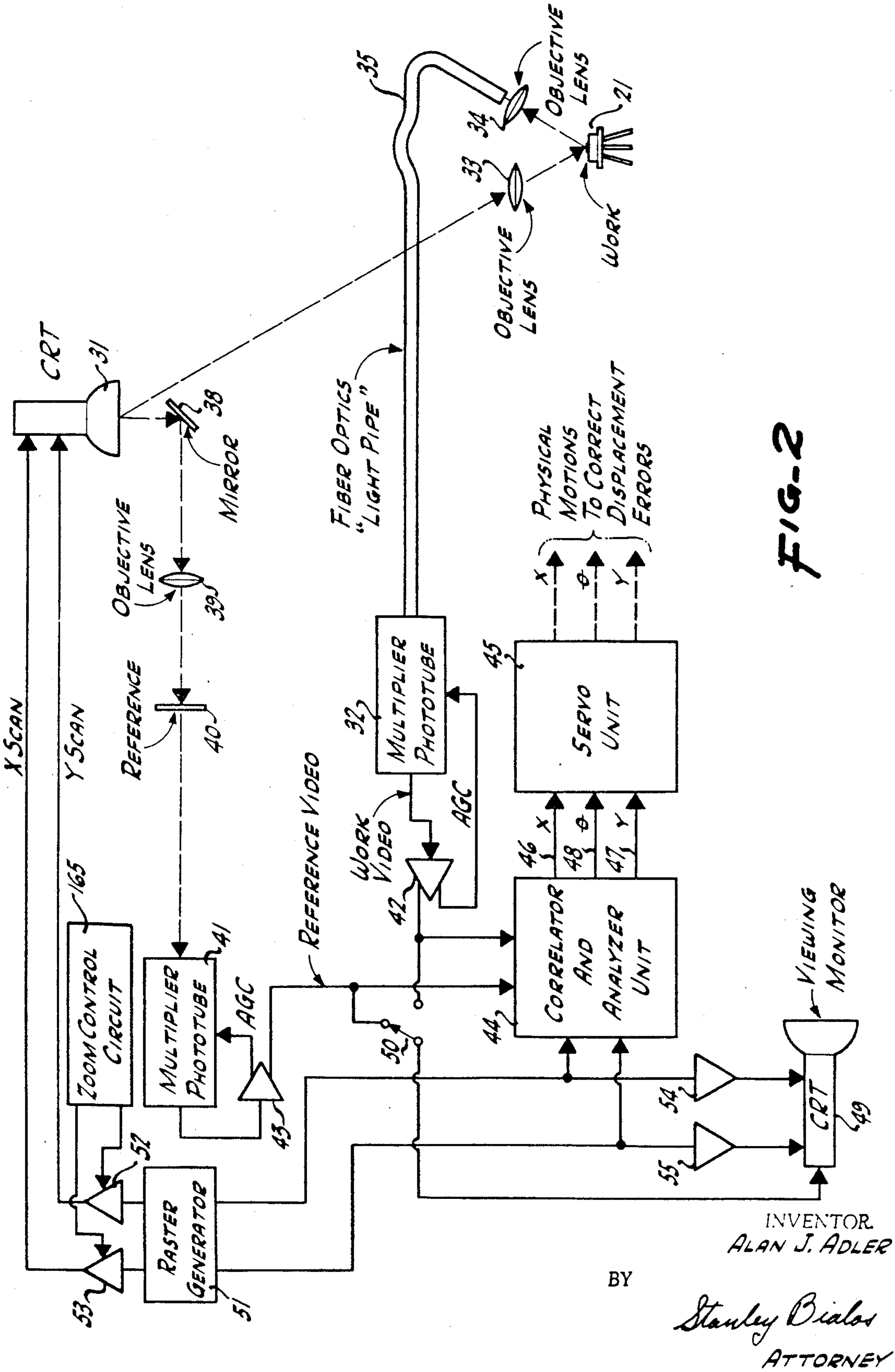
FIG. 2 is a diagrammatic view generally illustrating in its entirety the alignment system comprised in the apparatus shown in FIG. 1.

The general organization of the alignment system by which such overall results are accomplished is illustrated in FIG. 2, and reference will now be made thereto. As seen in this Figure, the system includes a scanning assembly comprising in the present instance the combination of a flying spot scanner 31 and a multiplier phototube 32. In this type of scanning assembly, only a small area of the object scene is illuminated at any one time by the flying spot or scanning light as it traverses such object scene in a predetermined scanning pattern to illuminate the entire object scene area-by-area in a given time interval. The phototube 32 is receptive throughout such time interval to illumination from the entire object scene. Other scanning systems might be employed, however, such as those using an image orthicon or vidicon tube; and in a system of such type the entire object scene would be illuminated continuously by an appropriate lighting means, and the scanning function would be performed by the tube which scans the object scene area-by-area.

The flying spot scanner 31 is mounted within the inspection module 15 and is oriented so that a portion of the scanning light is focused onto a restricted area of the component 21 through an objective lens 33. A part of the light reflected from the component 21 is focused by a lens 34 onto one end of a fiber optics "light pipe" or light conductor 35 comprising a bundle of light-conducting filaments operative in the aggregate to conduct an image from one end to the other of the conductor 35. Such other end of the light conductor 35 is positioned adjacent the face of the multiplier phototube 32 so as to image thereon the light transmitted to the conductor 35 by the lens 34. In certain cases it may be advantageous to interpose a color filter between the light conductor 35 and multiplier phototube 32 to restrict the incidence of stray light upon the multiplier phototube by passing thereto light having only the particular wavelengths produced by the flying spot scanner 31 (for example, the wavelengths defining the color blue).

A portion of the light developed by the flying spot scanner 31 is also directed by a mirror 38 to an objective lens 39 which focuses the light onto a reference standard 40 which, in the particular apparatus being considered, is a photographic transparency. The light directed onto the transparency is transmitted therethrough to a multiplier phototube 41. Accordingly, an object scene (a semiconductor component 21) and a reference standard (the photographic transparency 40) are scanned concurrently by the flying spot scanner 31, and light reflected from the object scene is directed onto the face of a multiplier phototube 32 and light transmitted through the reference standard is directed onto the face of a multiplier phototube 41.

The output signals of the multiplier phototubes 31 and 41 are respectively fed to video amplifiers 42 and 43 which amplify such output signals and transmit the same to a correlator and analyzer unit 44. The correlator section of the unit 44 is operative to compare such signals and develop error signals therefrom representative of any alignment error between the object scene and reference standard (and therefore between the object scene and implement associated therewith), and the analyzer section of the unit 44 is operative to develop from such error signals any necessary correction signals which are fed to a servo unit 45 controlling the lead-connector mechanism 17 to energize the same in the direction required to adjust correctively the positional relationship of the component 21 and wire feeder 23 in order to reduce such error signals toward zero. In the present apparatus, the correlator and analyzer unit 44 produces three output signals which are delivered to the servo unit 45, and such output signals constitute (considering a Cartesian coordinatesystem) an $x$-axis correction signal carried by a line 46, a $y$-axis correction signal carried by a line 47, and a rotational correction signal carried by a line 48.

The system illustrated in FIG. 2 also includes a viewing monitor in the form of a cathode ray tube 49—the video input to which can be connected selectively to either of the outputs of the multiplier phototubes 32 or 41 through a selector switch 50. The scanning rasters for the flying spot scanner 31 and viewing monitor 49 are developed in a raster generator 51 coupled to the deflection system of the flying spot scanner 31 through deflection amplifiers 52 and 53, and similarly coupled to the deflection system of the viewing monitor 49 through deflection amplifiers 54 and 55.

In operation of the system shown in FIG. 2, a reference standard 40 (in the form of a photographic transparency in the arrangement being considered) is located at a predetermined position along the optical path so as to be scanned area-by-area as the moving spot of the scanner 31 traverses its scanning raster. An object scene 21 (in the form of a semiconductor component in the arrangement being considered) is also located at a predetermined position along the optical path so as to be scanned concurrently and in enforced synchronism with the reference standard. A portion of the scanning light reflected from the component 21 is directed by the lens 34 and light conductor 35 to the face of the multiplier phototube 32; and in an analogous manner, light transmitted through the photographic transparency 40 is directed toward the face of the multiplier phototube 41.

The two multiplier phototubes 32 and 41 are operative, respectively, to develop output video signals representative at any instant in time of the contemporary value of the light then incident thereon. Such output video signals from the multiplier phototubes 32 and 41 are fed to the correlator and analyzer unit 44 wherein alignment error signals are developed representative of any misalignment between the component 21 and wire feeder 23, and wherein correction signals are developed from any such error signals to actuate the servo unit 51 to energize motor drives for the lead-connector mechanism 17 to displace the movable members thereof in the $x$, $y$ and $\theta$ directions as necessary to bring about a predetermined positional relationship between the component 21 and wire feeder 23. When such relationship has been established, it is sensed by the correlator and analyzer unit 44, and a command is sent to the mechanism 17 initiating a cycle of operation thereof in which a lead wire is secured to the appropriate connection area on the semiconductor component.

In the particular alignment system being considered, provision is incorporated for making a reference standard for subsequent use in the manner heretofore described. In explaining the procedure followed in making such reference standard, consideration will be given to FIG. 3 in particular; and referring thereto, it may be observed that the system is setup generally as heretofore explained except that a condition of proper alignment is first established between a component 21 (to be used as the subject in making the reference standard) and the wire feeder 23, not shown in FIG. 3. Such condition of proper alignment may be established in any manner, which in the usual case will be by manual observation and manipulation of the parts.

Positioned in front of the face of the flying spot scanner 31 is a light-diffusion surface in the form of a small projection screen 60 adapted to have an image of the reference component 21 focused thereon. Inserted into the apparatus in front of the multiplier phototube 32 is a light source 61 which may comprise a small incandescent lamp having a reflector therebehind. Light from the source 61 is transmitted through the conductor 35 and is focused by the lens 34 onto the reference component 21. A portion of the light reflected from the component 21 is focused through the lens 33 onto the diffusion surface or projection screen 60, and the image thereon is reproduced by means of the mirror 38 and lens 39 onto the emulsion of a photographic negative 62. In certain instances, the projection screen 60 can be omitted and reliance placed on the image-forming characteristics of the flying spot scanner 31 (i.e., the phosphorous coating along the inner surface of the tube face) to provide a visual reproduction of the image externally focused thereon since the scanner tube 31 may be turned off or be in a deenergized condition, in an electrical sense, at this time. This latter procedure has the advantage of obviating any problems of accurate focus because the face of the scanner tube 31 is evidently in precise focus with the component 21. any problems of accurate focus because the face of the scanner tube 31 is evidently in precise focus with the component 21.

The photographic negative 62 is positioned at precisely the location of the reference standard 40 heretofore described, and it may be a conventional photographic negative normally shielded from light and exposed in an ordinary manner. After exposure, the negative is processed to form a film transparency which can then be used as the reference standard 40 in the fabrication of components 21 structurally the same in all essential respects as the one used as the subject or reference during exposure of the negative 62. This procedure of making a reference standard by use of the optical components of the alignment system is exceedingly advantageous in that it provides a means for automatically obviating or compensating for distortions, discrepancies or anomalies as between the alignment system and any separate photographic system which would otherwise have to be used to make the reference standard, and which distortions, discrepancies or anomalies would require the incorporation of exacting and costly compensating devices.

The scanning raster employed in the alignment system comprises a dual diagonal pattern constituting a plurality of interlaced fields together defining one complete frame or scanning cycle which is then repeated at a predetermined rate. A scanning pattern of this type is illustrated and described in the copending patent application of Gilbert L. Hobrough, Ser. No. 394,502 filed Sept. 4, 1964, now U.S. Pat. No. 432,674 to which reference may be made for a complete consideration of such pattern and its advantages. In a particular instance which has been found satisfactory, the scanning pattern defines a generally square-shaped raster having a repetition rate of 50 frames per second with each frame comprising an interlace of two fields. In such instance, each field is formed of substantially thirty lines to the diagonal or a total of 60 lines for a complete frame. A scanning pattern comprising about 60 lines per frame has been found to provide an acceptable signal-noise ratio, which ratio is generally proportional to the number of scanning lines per frame.

Figure 4:
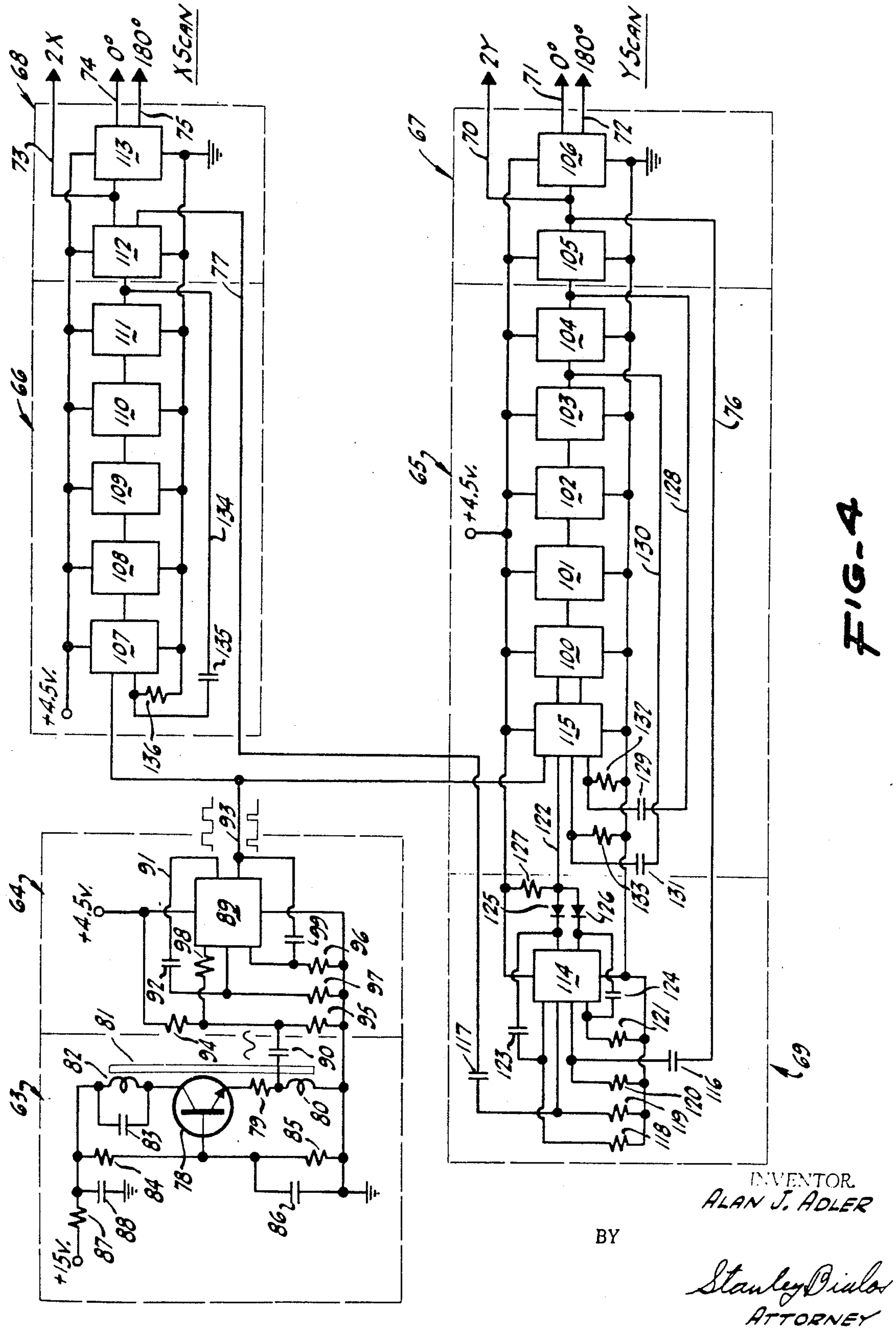
FIG. 4 is a schematic circuit diagram of the raster generator employed in the system.

A raster generator circuit operative to produce the deflection waveforms requisite for the development of the desired dual diagonal scan is illustrated in FIG. 4. This circuit utilizes a relatively high-frequency oscillator and two counting circuits or dividing channels which provide the two signals independently necessary for the deflection axes (hereinafter referred to for convenience as the $x$ and $y$ deflection axes). With this circuit arrangement, the phase relationship between the $x$ and $y$ waveforms is rigidly controlled cycle-by-cycle, and the two counting circuits divide the oscillator frequency by consecutive odd numbers.

The number of scanning lines across each diagonal of the raster during each field is approximately equal to the division ratio or number of the associated counting circuit, and the field repetition rate of the scanning pattern is approximately equal to the difference between the output frequencies of the two counting circuits. In the particular circuit illustrated, the division ratios of the two channels are 29 and 31, respectively, thereby giving approximately 29 lines to one diagonal and 31 lines to the other. The frequencies of the two counting circuit output signals (i.e., the $x$ and $y$ scanning signals) are 1,451.5 c.p.s. and 1,551.75 c.p.s., so that the difference therebetween is about 100 c.p.s., and a field repetition rate of approximately 100 cycles per second is provided with a single interlace of two fields per frame.

THe circuit as illustrated in FIG. 4 is divided by broken lines into major components which constitute a sine wave oscillator 63, an amplifier 64 operative to receive the output signal from the oscillator and provide an amplified pulse output having about the same frequency as that of the oscillator, a pair of counting or dividing channels 65 and 66 (the first of which divides the oscillator frequency by 29 and the second of which divides the frequency by 31), a pair of additional divider units 67 and 68 respectively associated with the channels 65 and 66 for further dividing the output frequencies thereof by two, and a synchronizer 69 operative in association with the two dividing channels 65 and 66 for enforcing a continuous synchronous relationship therebetween such that the scanning pattern constitutes an interlace of two fields per frame.

In the particular circuit illustrated, the output frequency of the oscillator 63 is 180 kilocycles per second, and the channel 65 divides such frequency by 29 to provide a signal at the output terminal 70 of approximately 3,103.5 c.p.s. The dividing unit 67 further divides such output signal from the channel 65 by two, thereby providing at the output terminals 71 and 72 signals having a frequency of approximately 1,551.75 c.p.s. The signals at the output terminals 71 and 72 are 180° out of phase and one or the other may be used selectively to provide the y scanning signals which are delivered through the deflection amplifiers 52 and 54 to the flying spot scanner 31 and viewing monitor 49. Evidently, then, the signal appearing at the output terminal 70 may be taken to have a frequency of twice that of the y scanning signal.

Similarly, the channel 66 divides the oscillator frequency by 31 to provide a signal at the output terminal 73 of approximately 2,903 c.p.s. The dividing unit 68 further divides such output signal from the channel 66 by two, thereby providing at the output terminals 74 and 75 signals having a frequency of approximately, 1,451.5 c.p.s. The signals at the output terminals 74 and 75 are 180° out of phase and one or the other may be used selectively to provide the $x$ scanning signals which are delivered through the deflection amplifiers 53 and 55 to the flying spot scanner 31 and viewing monitor 49. Evidently then, the signal appearing at the output terminal 73 may be taken to have a frequency of twice that of the scanning signal.

The synchronizer receives as inputs thereto output signals from the channels 65 and 66 via lines 76 and 77, respectively, and in response to such signals adds input pulses as necessary to the channel 65 to enforce the requisite synchronous relationship between the channels 65 and 66 so that they divide the oscillator frequency in the proper ratios.

The oscillator 63 is a self-excited oscillator substantially conventional in all essential respects, and comprises a transistor 78 having an emitter that is grounded through a serially connected current-limiting resistance 79 and winding 80 of a transformer 81 by which the emitter is inductively coupled to a tuned circuit in the collector circuit of the transistor, which tuned circuit includes the other winding 82 of the transformer and a capacitance 83 connected in shunt therewith. The base of the transistor is connected to the juncture of a pair of voltage divider resistances 84 and 85 connected between the supply voltage and ground, and an AC path to ground from the base is provided by a capacitance 86 shunting the resistance 85. A voltage smoothing network comprising a resistance 87 and capacitance 88 connect the supply voltage to the voltage divider resistance 84 and to the collector of the transistor through the tuned circuit 82, 83.

The amplifier unit 64 includes an integrated circuit 89 defining a dual OR gate, and it is coupled to the emitter circuit of the transistor 78 through a capacitor 90. The input signal delivered to one half of the amplifier unit 64 from the oscillator 63 is a sine wave, and one of the signals developed by the first half of the integrated circuit 89 in response to such sine wave input signal is a square wave output signal fed to the second half of the integrated circuit via conductor 91 and capacitance 92. Such square wave signal is utilized by the circuit in developing a pulse-type output signal appearing on an output signal 93 from the amplifier unit 64. The pulse-type output signal has substantially the same frequency as that of the sine wave output signal from the oscillator 63. In addition to the capacitances 90 and 92 and integrated circuit 89, the amplifier includes voltage dividing resistances 94 and 95, biasing resistances 96 and 97, resistance 98, and capacitance 99. The integrated circuit 89 may be an LU332 dual OR gate sold by Signetics Corporation of Sunnyvale, California.

The divide-by 29 channel 65 comprises five series-connected integrated circuits respectively denoted for identification with the numerals 100, 101, 102, 103 and 104, and the associated dividing unit 67 constitutes in a functional sense a continuation of such channel and includes integrated circuits 105 and 106. The integrated circuits 100 through 106 are all identical, and each constitutes a binary element in the form of a JK flip-flop. In an analogous manner, the divide-by-31 channel 66 includes five serially connected integrated circuits 107 through 111, and the associated dividing unit 68 is a continuation of such channel and includes integrated circuits 112 and 113. The integrated circuits 107 through 113 are also binary elements in the form of JK flip-flops. All of the circuits 100 through 113 may be LU 320 flip-flops sold by the aforementioned Signetics Corporation.

The synchronizer unit 69 comprises an integrated circuit 114 defining a dual OR gate coupled to the counting channel 65 by an integrated circuit 115 forming the input stage thereof. As indicated hereinbefore, the output signal from the dividing stage defined by the integrated circuit 105 of the counting channel 65 is fed through the signal line 76 and a capacitance 116 to one of the inputs of the dual or-gate integrated circuit 114; and, similarly, the output signal from the dividing stage defined by the integrated circuit 112 of the counting channel 66 is fed through the signal line 77 and a capacitance 117 to another input of the dual or-gate integrated circuit 114. The dual OR gate defined by the integrated circuit 114 is modified by a plurality of resistances 118 through 112 and capacitances 123 and 124 so as to form a dual monostable multivibrator operative when energized to produce narrow output pulses. Such output pulses are delivered to a two-input AND gate formed by a pair of diodes 125 and 126 and a resistance 127 connected to the anodes thereof; and the output signals from such AND-gate (125, 126 and 127) provide an additional synchronizing pulse, when needed, along the conductor 122 which feeds each such pulse to the input stage 115 of the counting channel 65.

The unit 69 functions to produce interlace synchronization for the counting channels 65 and 66 and in this respect, if the leading edges of the positive-going waveforms or signal outputs respectively appearing on the conductors 76 and 77 are in precise coincidence in time, the resulting two narrow output pulses delivered by the circuit 114 to the AND gate (i.e., the diodes 125 and 126 and resistance 127) will coincide and an output synchronization pulse will appear on the conductor 122 for delivery thereby to the circuit 115. The circuit 115 is a dual OR gate and one half thereof receives the differentiated output pulses or signals from the flip-flops defined by the integrated circuits 103 and 104 via a signal line 128 and capacitance 129 and a signal line 130 and capacitance 131. In response to such input signals, the integrated circuit 115 produces output pulses at one of the output terminals thereof which are fed to the reset terminal of the integrated circuit 100.

Three such pulses are fed to the circuit 100 in each complete counting cycle of the channel 65; and more particularly, an output pulse is delivered to the circuit 100 once when the output signal from the circuit 104 is going positive (which occurs once in each counting cycle) and once for each time that the output signal from the circuit 103 is going positive (which occurs twice in each counting cycle). These three additional reset pulses delivered to the flip-flop circuit 100 from the OR-gate circuit 115 are effective to convert the counting channel 65 from a divide by 32 counter into a divide by 29 counter.

The other half of the dual OR gate comprised by the integrated circuit 115 receives as its input the aforementioned amplified output signal appearing on the line 93, which output signal is derived from the oscillator 63 and has a frequency of 180 kilocycles per second. The amplified and shaped oscillator input signal delivered to the integrated circuit 115 on the line 93 and the synchronization signal delivered to the circuit 115 on the line 122 are transferred by the circuit to one of the input terminals of the circuit 100 causing it to count. Whenever a synchronization pulse appears on the conductor 122, which occurs whenever the two input signals delivered to the circuit 114 by the conductors 76 and 77 are in precise phase coincidence, the counting channel 65 is forced to register an additional count thereby causing it to return to the desired condition of synchronization with the counting channel 66 in which an interlace is assured of the $x$ and $y$ scanning lines appearing on the face of the flying spot scanner 31. This condition of synchronization will continue without additional pulses being generated until synchronization is lost for some reason, which loss might be caused, for example, by power transients, power losses or similar electrical disturbances. Should synchronization be lost, the circuit 69 will respond instantaneously thereto to again provide a synchronization pulse on the conductor 122 for delivery thereby to the integrated circuit 115.

It may be noted that a dividing channel of the type disclosed in which the divisor is an odd number (i.e., 29 in one instance and 31 in the other) results in an output signal which is nonsymmetrical; and since a nonsymmetrical output signal is undesirable in the alignment system being considered, the final divide-by-2 stages 67 and 68, are added to provide an even-numbered divisor for the final stage so that a symmetrical output signal will be obtained.

DEFLECTION AMPLIFIERS

As illustrated in FIG. 2, the $x$ and $y$ scanning signals from the raster generator 51 are delivered to the scanning cathode ray tube 31 and viewing cathode ray tube 49 via the pairs of deflection amplifiers 52, 53, 54 and 55 respectively associated therewith. The $x$ scanning signal may be taken from either the signal line 74 or 75, as indicated hereinbefore; and, similarly, the $y$ scanning signal may be taken from either the signal line 71 or 72. Although only one $x$ and $y$ scanning signal is required to energize the scanning rasters of the cathode ray tubes 31 and 49, the provision of an additional $x$ and an additional $y$ scanning signal 180° out of phase with the aforementioned $x$ and $y$ scanning signals can be useful should it become desirable to shift the scanning pattern by 180° to accommodate changes in the optical paths through the alignment system. It may be noted that the signals appearing on the lines 73 and 70 which have, respectively, twice the frequency of the $x$ and $y$ scanning signals are used in the correlator and analyzer unit 44, as will be described in detail hereinafter.

Figure 5:
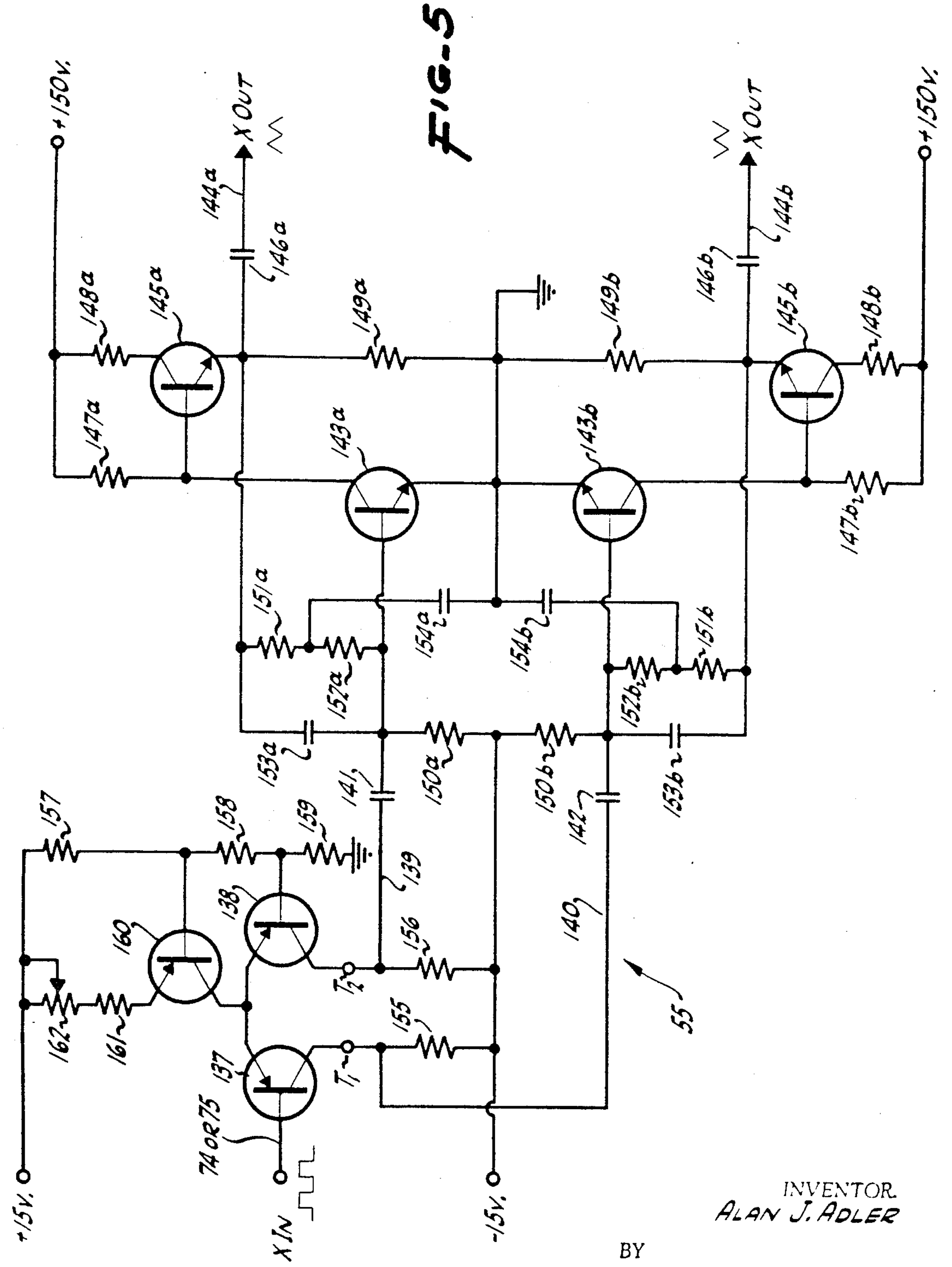
FIG. 5 is a schematic circuit diagram of a deflection amplifier for the viewer used in the system.

The deflection amplifiers 52 and 53 are identical, as are the deflection amplifiers 54 and 55; but a slight difference exists as between the pair of amplifiers 52, and 53 associated with the scanning cathode ray tube 31 and the pair of deflection amplifiers 54 and 55 associated with the viewing cathode ray tube 49, as will be made more evident in the following discussion of FIGS 5 and 6. The deflection amplifiers 54 and 55 are illustrated in FIG. 5 which is a schematic circuit diagram of one of these two amplifiers and, for purposes of specificity, may be taken to be the amplifier associated with the $x$ scanning signal. Accordingly, the input signal thereto is taken from either the line 74 or 75, as the case may be, and is delivered to the first stage of the amplifier 55, which first stage thereof comprises a squaring circuit operative to accept the square wave $x$ scanning input signals thereto and to limit the amplitude thereof as desired in order to reduce or eliminate any noise contained in such input signals.

The squaring circuit provides two output signals which are 180° out of phase, and these signals appear respectively on the collector elements of a pair of transistors 137 and 138. Such two output signals from the squaring circuit are respectively transmitted on conductors 139 and 140 through coupling capacitors 141 and 142 to the base elements of transistors **143*a* and 143*b* respectively comprised in separate integrating amplifier circuits arranged in a push-pull configuration and which provide on output signal lines 144*a* and 144*b* respectively associated therewith sawtooth sweep signals which are 180° out of phase and are delivered to the opposite deflection plates forming the $x$ scan deflection system of the viewing cathode ray tube 49**. The two integrating amplifiers are identical, and they provide output scanning signals which are 180° out of phase because the two input signals thereto have an opposite phase relationship. In that one of the integrating amplifiers is a duplicate of the other, the respectively corresponding elements of each are denoted with the same numeral but with the suffixes *a* and *b* used to differentiate there between.

Considering the amplifier associated with the input signal line 139 and coupling capacitor 141, the transistor **143*a* thereof has a grounded emitter, and the output signal therefrom is fed directly to the base of an output stage defined by a transistor 145*a* which has its emitter connected to the aforementioned output signal line 144*a* by a capacitor 146*a*. The collector elements of the transistors 143*a* and 145*a* are connected to the voltage supply by load resistances 147*a* and 148*a*, and the emitter of the transistor 145*a* is grounded through a resistance 149*a*. The base element of the transistor 143*a* is connected to a negative voltage supply by a biasing resistance 150*a*; and the base element further has connected thereto a pair of serially related resistances 151*a* and 152*a* which are arranged in parallel with a capacitance 153*a*. An AC path to ground for such base element is provided by a capacitance 154*a* connected to the juncture of the resistances 151*a* and 152*a***.

The squaring circuit comprises, in addition to the transistors 137 and 138, current-limiting resistances 155 and 156 respectively connecting the collector elements of such transistors to the aforementioned low-voltage supply, and it further comprises a plurality of serially connected voltage divider resistances 157, 158 and 159 which provide a DC flow path between ground and a positive potential low-voltage source. The base element of the transistor 138 is connected to the juncture of the resistances 158 and 159; and, similarly, the base element of a transistor 160 is connected to the juncture of the resistances 157 and 158. The collector element of the transistor 160 is connected directly to the emitter elements of the two transistors 137 and 138, and the emitter of the transistor 160 is connected to such positive potential low-voltage source through a fixed current-limiting resistance 161 and a potentiometer 162.

Adjustment of the potentiometer 162 varies the magnitude of the current flowing in the emitter circuit of the transistor 160 and thereby provides a means for selectively adjusting the size of the scanning raster along the $x$-axis of the viewing cathode ray tube 49. Since the deflection amplifier 54 constitutes a duplicate of the amplifier 55, it will be apparent that an adjustment means is provided for selectively varying the size of the scanning raster along the $y$ axis of the viewing cathode ray tube 49.

Evidently, the deflection amplifiers 54 and 55 accept the square wave output signals from the raster generator 51, limit such signals to reduce the noise level thereof, and provide amplified triangular waveforms defining the scanning signals for energizing the scanning raster of the viewing cathode ray tube 49. Two separate scanning signals for each raster axis are provided by amplifiers 54 and 55, as noted heretofore, and the two signals from each amplifier are out of phase by 180°. With the particular cathode ray tubes 31 and 49 utilized in the system being considered in detail, the use of two scanning signals in phase opposition for each raster axis prevents deflection-caused defocusing and permits smaller-amplitude scanning signals to be used than would be the case if but one sweep signal were provided for each deflection axis.

Figure 6:
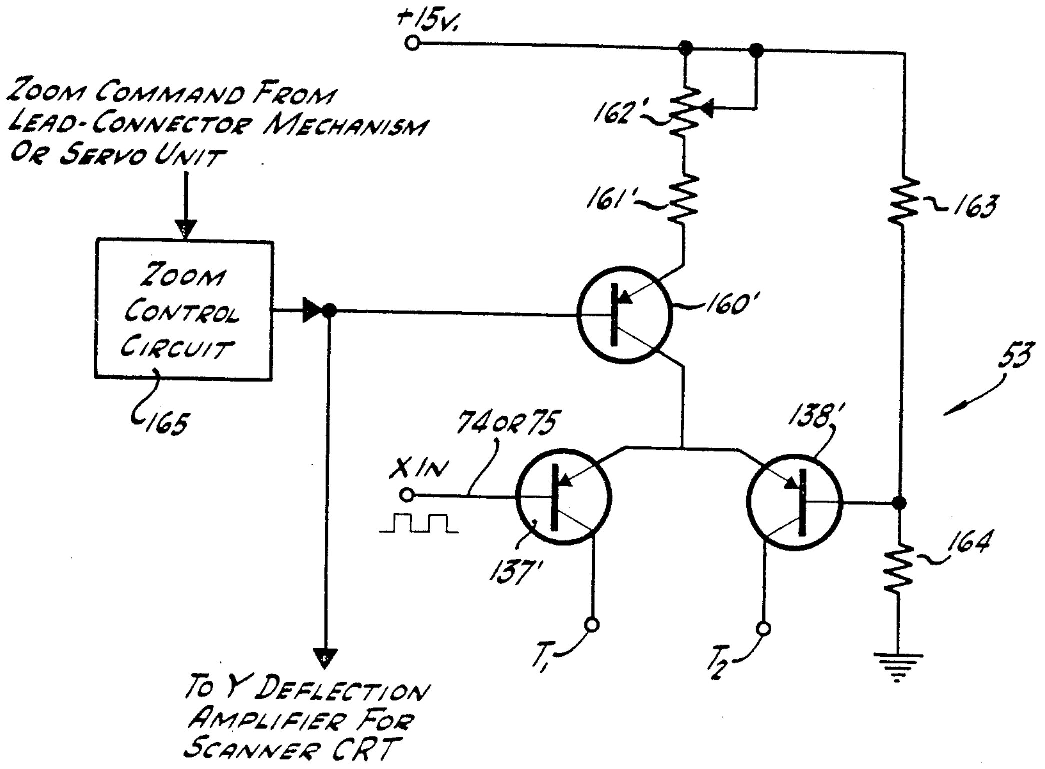
FIG. 6 is a partial schematic circuit diagram showing the change made in the deflection amplifier illustrated in FIG. 5 for use of such amplifier in association wish the scanning tube of the system.

It may be noted that terminals $T_1$ and $T_2$ are shown in FIG. 5 adjacent the collector elements of the transistors 137 and 138, and these terminals are illustrated as a matter of convenience in describing the circuit shown in FIG. 6, which illustrates the difference between the deflection amplifiers 54, 55 for the viewing monitor 49 and the deflection amplifiers 52, 53 for the flying spot scanner 31. In this respect, these two terminals $T_1$ and $T_2$ are also illustrated in FIG. 6, to which references will now be made.

The circuit shown in FIG. 6 is a squaring circuit which is substantially the same as the squaring circuit shown in FIG. 5, and correspondingly includes a pair of transistors 137' and 138' the first of which has a collector element connected to the terminal $T_1$ and a base element connected to the output signal line 74 or 75, as the case may be, from the raster generator 51. The emitter elements of the transistors 137' and 138' are connected in common to the collector element of a transistor 160' which has its emitter element connected to the positive potential low-voltage supply through a fixed resistance 161' and potentiometer 162' adjustable to vary the size of the scanning raster of the flying spot scanning cathode ray tube 31.

The base of the transistor 138' is connected to the juncture of serially connected voltage divider resistances 163 and 164 which are connected between ground and such positive potential low voltage supply. The base of the transistor 160' is connected to a zoom control circuit, generally denoted with the numeral 165, operative to reduce the scanning raster of the scanning cathode ray tube 31 and thereby magnify or "zoom in" on a restricted area of the transistor or other component 21. As indicated in FIG. 6, the zoom control circuit 165 is also connected to the $y$ deflection amplifier 52—assuming that the amplifier partially shown in FIG. 6 represents the $x$ deflection amplifier 53.

Further considering the zoom control circuit 165 (the details of which will be described subsequently), the function thereof is to adjust automatically the size of the raster of the flying spot scanner tube 31 in a continuous progression approximately corresponding to the diminishing magnitudes of the $x$, $y$, and $\theta$ correction signals, which changing magnitudes thereof are the result of the object scene and work implement being relatively displaced toward the desired condition of alignment following initial acquisition of the object scene by the scanning system. In accomplishing this function, the zoom control circuit produces a progressively changing output voltage or voltage ramp effective to change progressively the scanning area from an initially large acquisition area to a finally small alignment area. Such general approximation between the slope or rate of change of the voltage ramp and changing magnitudes of the correction signals (and corresponding change in the size of the scanning raster) is advantageous in that it enables the system to "hold" or maintain continuously the requisite correlation operation performed in the unit 44, which maintenance thereof might not be assured if, for example, the area scanned by the flying spot scanner 31 were reduced before the x, y, and θ correction signals were proportionately reduced.

In such functioning of the zoom control circuit, the raster of the scanning cathode ray tube 31 initially will be, say, two or three times the area of the semiconductor component 21, and the correction signals from the correlator and analyzer unit 44 typically will be quite large at this time. However, the zoom control circuit 165 continuously reduces the size of the area being scanned by the tube 31 as the correction signals are reduced in magnitude by operation of the alignment system until the area scanned is reduced to a size just sufficiently large to include only the connection area of the semiconductor component, thereby excluding the outer perimetric edge portions thereof. When such reduction in size has been achieved the component, or metallized connection area thereof, will be properly aligned with the tip 24 of the feeder tube 23.

Thus, such functioning of the zoom control circuit enables the system to align very accurately the tip 24 of the feeder tube 23 with the appropriate metallized connection area along the semiconductor component, which connection area is smaller than that of the entire component. For example, and referring to FIG. 9 which is an enlargement of an exemplary semiconductor constituting an integrated circuit component or "chip," the surface area of the entire component may be in the order of 0.040 inches square and its thickness may be 0.005 of an inch. However, the entire metallized connection area is somewhat smaller and lies within the broken line boundary shown in FIG. 9. For purposes of identification the entire component is denoted with the numeral 21′ and the metallized area thereof with the numeral 21*a*.

While the area 21*a* is rather sharply defined in a perimetric sense, the edge portions of the entire component may be somewhat irregular. Such irregularity occurs because of the nature of the manufacturing process in which a plurality of chips are formed concurrently on an integral member which is quite brittle, the member then is scribed by a sharp instrument intermediate the various components, and it is finally broken or fractured into the individual components or chips much in the manner of cutting a pane of glass into smaller pieces. Clearly, then, the perimetric boundaries of the entire component 21′ should not be used for exact alignment purposes because inaccuracies in alignment would inevitably occur as a consequence of such boundary irregularities. Thus, the alignment system being considered avoids the possibility of such occurrence by being able quite effectively to reduce alignment error toward zero by progressively decreasing the area of observation to the very particular area requiring alignment with the lead wire.

VIDEO AMPLIFIERS

Figure 7:
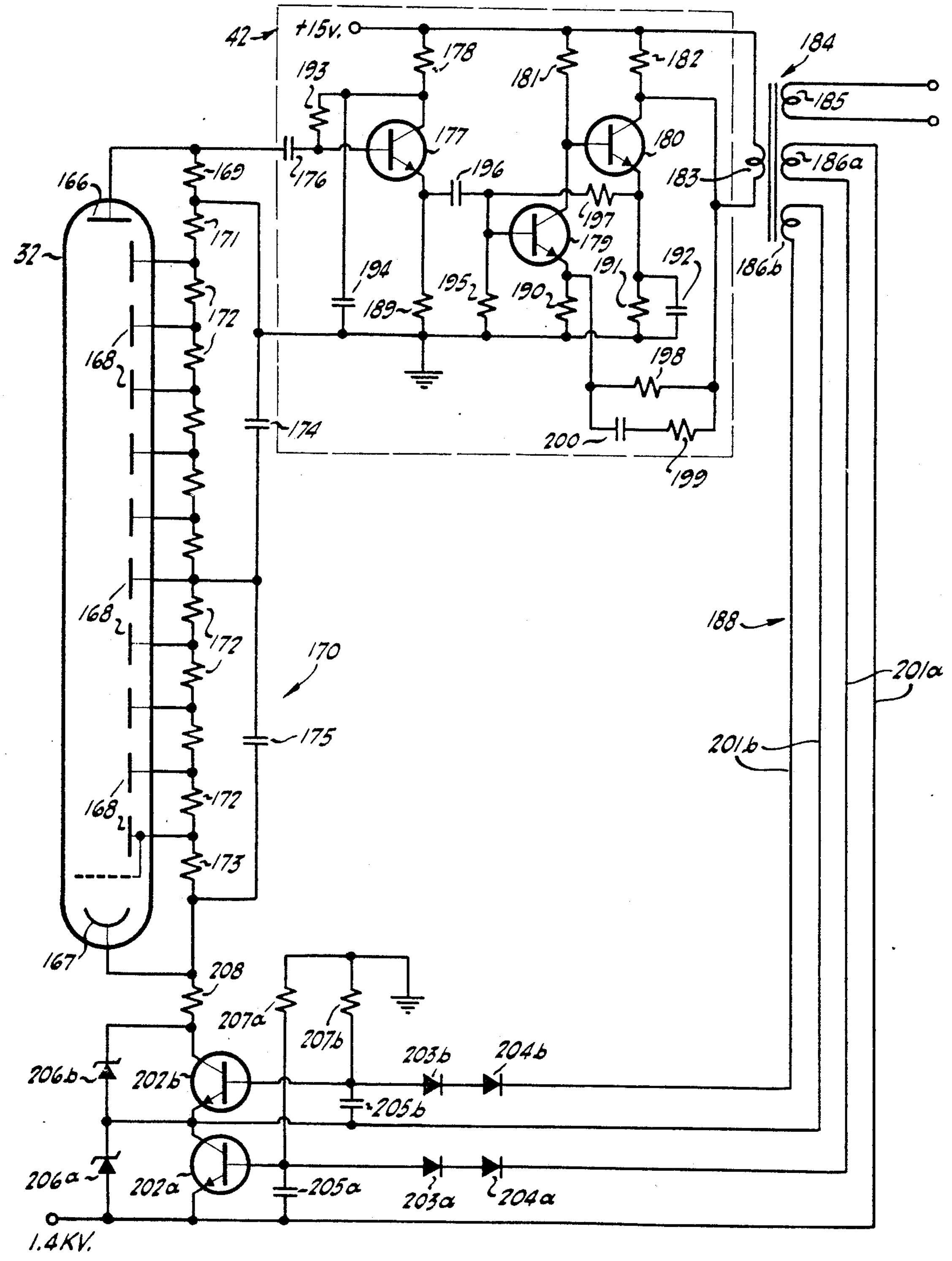
FIG. 7 is a schematic circuit diagram of the video amplifier used in the system.

The multiplier phototubes 32 and 41 and video amplifiers 42 and 43 respectively associated therewith are essentially identical, and the details of one such phototube-amplifier combination are illustrated in FIG. 7 and for purposes of specific identification may be taken to be the multiplier phototube 32 and the amplifier 42 therefor. Referring to FIG. 7, the multiplier phototube 32 is seen to be provided with an anode 166, a photo cathode 167, and a plurality of dynodes indicated collectively with the numeral 168. The anode 166 is grounded through a resistance 169, and the operating potentials for the various dynodes are determined by a voltage divider network 170 comprising a resistance 171 connected in series between the resistance 169 (at ground potential) and the last or final of the ten dynodes 168 provided by the particular multiplier phototube illustrated. The voltage divider 170 further includes nine series-connected resistances, collectively denoted 172, respectively connected between the ten dynodes of the multiplier phototube 32. A further resistance 173 comprised by the voltage divider 170 is connected in series between the first or control dynode of the multiplier phototube and the photosensitive cathode thereof. Smoothing capacitances 174 and 175 are included in the voltage-dividing network 170, and such capacitances are connected, respectively, in shunt with the resistance 171 and five of the resistances 172, and with the resistance 173 and four of the resistances 172.

The video output signals from the anode 166 of the multiplier phototube 32 are fed by a coupling capacitance 176 to the base of a transistor 177 defining the input stage of the amplifier 42. The collector element of the transistor 177 is connected to the aforementioned positive potential low voltage supply through a load resistance 178; and, in a similar manner, the collector elements of transistors 179 and 180 are connected to such voltage supply through load resistances 181 and 182, respectively. The collector current constituting the output signal of the transistor 180 flows through the primary winding 183 of an output transformer 184 and is operative to energize the secondary windings 185, 186*a* and 186*b* of such transformer, the first of which secondary windings is connected to the correlator and analyzer unit 44 (and switch 50), and the last two of which secondary windings constitute a part of an automatic gain control circuit generally denoted 188.

The amplifier 42 is substantially conventional, and is operative to provide at the output transformer 184 amplified replicas of the video input signals fed to the amplifier from the multiplier phototube 32. In accordance with conventional practice, the emitter elements of the transistors 177, 179 and 180 are respectively connected to ground through resistances 189, 190 and 191, the latter of which is shunted by a capacitance 192. Additionally, the base of the transistor 177 is connected by a biasing resistance 193 to the positive voltage supply, through the resistance 178, and has an AC path to ground through a capacitance 194; the base of the transistor 179 is connected to ground through a resistance 195 and is also coupled to the emitter of the transistor 177 through a capacitance 196 and to the emitter of the transistor 180 through a resistance 197; and the collector of the transistor 180 is coupled to the emitter of the transistor 179 through a circuit comprising parallel branches formed of a resistance 198 in one instance and by a serially connected resistance 199 and capacitance 200 in the other instance.

The automatic gain control 188 has two substantially identical branches 201*a* and 201*b* respectively including therein the aforementioned transformer windings 186*a* and 186*b*. In view of such identity, the same numerals are employed to designate the respectively corresponding parts of the two branches, and differentiation therebetween is denoted by use of the suffixes "*a*" and "*b*." Considering the branch 201*a*, the winding 186*a* thereof is connected between the base and emitter of a transistor 202*a* defining an amplifier for the DC component of the feedback signal delivered thereto through a rectifier, formed by series-connected diodes 203*a* and 204*a*, in the base circuit of the transistor. Such DC feedback signal from the rectifier has the ripple removed therefrom by a smoothing capacitance 205*a* connected between the base and emitter of the transistor. A voltage-limiting device 206*a* in the form of a Zener diode is connected between the emitter and collector of the transistor 202*a* and prevents the voltage therebetween from exceeding the capacity of the transistor. A biasing resistance 207*a* is connected between ground and the base of the transistor 202*a* and defines the normal operating condition thereof.

The automatic gain control branch 201*b* contains the same elements as the branch 201*a*, as explained heretofore, and the outputs of the two branches are effectively connected in series; wherefore the collector of the transistor 202*a* is connected to the emitter of the transistor 202*b* and the Zener diodes 206*a* and 206*b* are connected in series. The collector of the transistor 202*b* is connected to the photosensitive cathode 167 of the multiplier phototube 32 through a resistance 208, and, although this resistance is not essential, it is used to limit to an acceptable value any transient currents delivered by the DC amplifiers comprising the transistors 202a and 202b.

In operation of the automatic gain control circuit, a portion of the amplified replica of the video output signal from the multiplier phototube 32 is delivered to each of the transistors 202, which transistors are normally biased by the respectively associated resistances 207 in an operating condition, with the result that there is substantially no voltage drop across the circuit and the total value of the applied voltage (in the order of 1.40 kilovolts) appears across the multiplier phototube. The rectifiers defined by the associated diodes 203 and 204 are operative to produce DC signals tending to bias the transistors 202 toward cutoff; and in the particular circuit being considered, such DC signals are sufficient to cutoff the transistors whenever the video output signal from the multiplier phototube 32 exceeds a value of about one volt peak-to-peak. Once the transistors are cutoff, the DC voltage drop across the Zener diodes 206 increases sharply as the video output signal of the multiplier phototube 32 rises about such one-volt peak-to-peak value.

It may be observed that the DC voltage drop across the diodes 206 is substantially proportional to the voltage of the video output signal from the phototube 32. Thus, as the video output signal increases in magnitude the voltage drop across the automatic gain control branches 201 (i.e., across the Zener diodes 206) increases, thereby reducing the magnitude of the voltage applied across the multiplier phototube 32; and since the video output signal thereof is determined by the value of the voltage applied across the tube, such output signal will decrease correspondingly with decreases in the applied voltage. In the circuit being considered, the voltage applied across the multiplier phototube 32 can be reduced from the supply value of approximately 1.40 kilovolts to a value of about 760 volts. Should a greater voltage drop be required, additional automatic gain control branches 201 are included in the circuit.

CORRELATOR AND ANALYZER UNIT

The correlation and analyzer procedures and apparatus used in the present alignment system are substantially the same as those employed in the aforementioned Patent application, Ser. No. 394,502, filed Sept. 4, 1964, except that such procedures and apparatus as employed herein are materially simplified. In this respect, the correlation system disclosed in such patent application includes means for detecting 1st order registration errors comprising scale, skew and rotation errors and also for detecting 2nd order registration errors. In the present alignment system, no accommodation is required for any of the 2nd order errors or for the 1st order scale errors so that only *x* skew and *y* skew error signals need be provided with rotation or error being the algebraic sum of the *x* skew and *y* skew signals.

In producing the correction signals appearing on the lines 46, 47 and 48, the unit 44 observes the video signals transmitted thereto through the video amplifiers 42 and 43 and detects in such signals any differences in timing between corresponding detail in the two video channels respectively representing the object scene as viewed by the multiplier phototube 32 and the reference standard as viewed by the multiplier phototube 41. The unit 44 also receives reference signals from the raster generator 51, which reference signals indicate the scanning spot position of the flying spot scanner 31 in the "*x*" and "*y*" directions separately. From these input signals, the unit 44 computes the direction of any misalignment between the object scene and reference standard and makes this information available in the form of correction signals which are fed to the servo unit 45 via the signal lines 46, 47 and 48.

Figure 8:
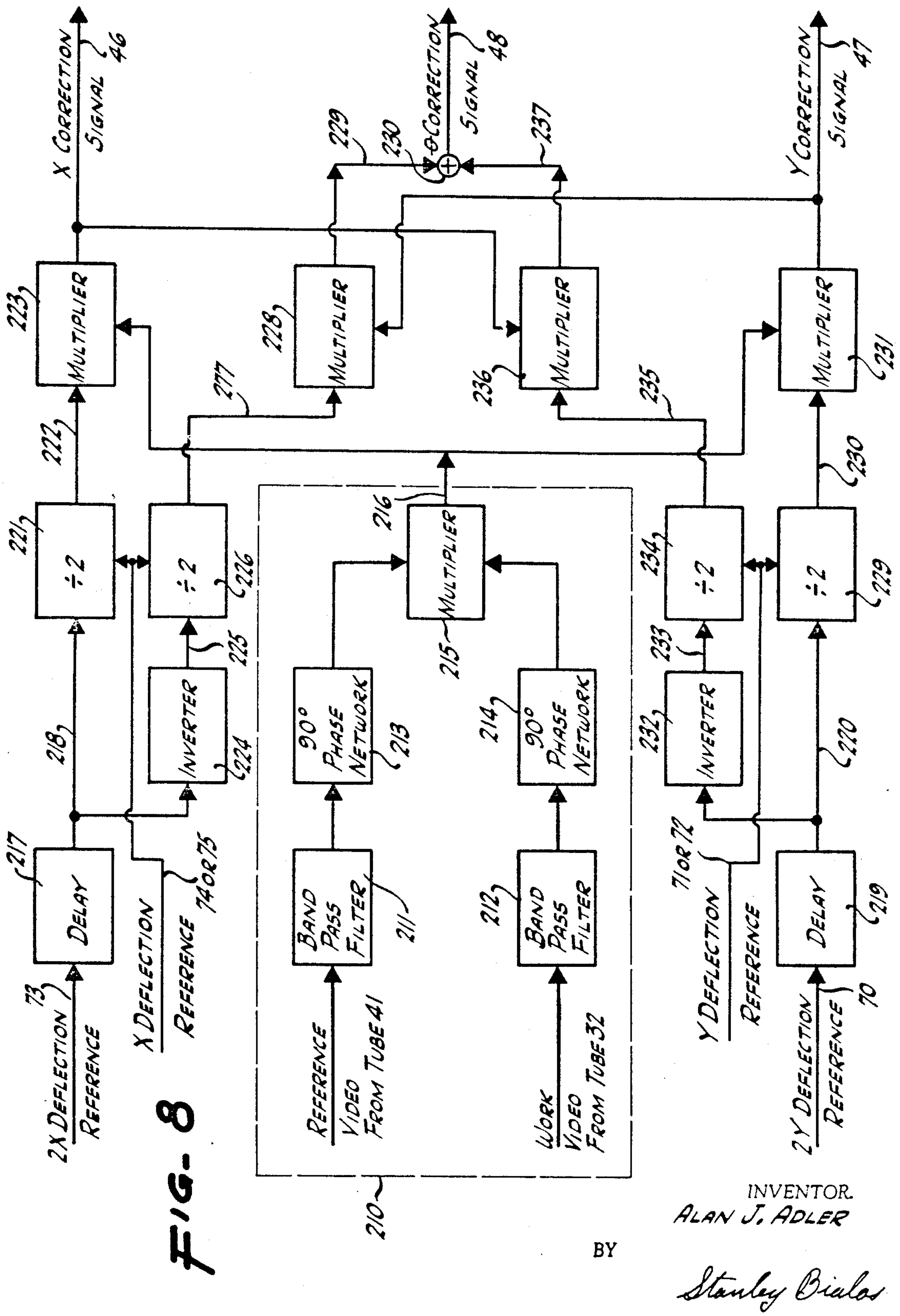
FIG. 8 is a block diagram of the correlator and analyzer unit used in the system.

As a matter of convenience, a block diagram of the correlator and analyzer unit 44 is illustrated in FIG. 8 and referring thereto, the correlator section of the unit may be taken to comprise those components enclosed within broken lines and denoted in the aggregate with the numeral 210. The analyzer section of the unit constitutes the remaining components shown in FIG. 8, which components are symmetrically disposed with respect to the analyzer section 210. The unit 44 has three outputs constituting the *x* correction signal, *y* correction signal and $\theta$ or rotation correction signal respectively appear on the lines 46, 47 and 48 leading to the servo unit 45, as shown in FIG. 2. The input signals to the unit 44 constitute the reference standard and object video signals from the multiplier phototubes 41 and 32, respectively, and the timing reference signals from the raster generator 51 which, in the present instance, constitute the 2X and 2Y scanning signals appearing on the lines 73 and 70. Further input signals to the unit 44 are the *x* and *y* deflection signals appearing on the lines 74 and 71, or in the alternative on the lines 75 and 72, which deflection signals are used for synchronization purposes, as will be described hereinafter.

Considering the block diagram of FIG. 8 in greater detail, the correlator section 210 of the unit 44 is seen to be provided with bandpass filters 211 and 212 that determine the particular portion of the video spectrum to which the correlator is responsive. In addition to the band-pass filters 210 and 211 the correlator section 210 includes 90° phase shift networks 213 and 214 respectively associated with the bandpass filters 211 and 212, and a multiplier 215 respectively receiving as the two inputs thereto the output signals from the phase shift networks 213 and 214. The output signal from the multiplier 215 appears on a signal line 216 for delivery to both the *x* and *y* channels of the analyzer section of the unit 44.

The correlator section 210 is operative to provide on the line 216 an output signal having characteristics which are dependent upon the relative timing between the video input signals from the multiplier phototubes 41 and 32. In the attainment of such output signal, the bandpass filters 211 and 212, as stated hereinbefore, select and pass those frequencies of the video spectrum within a predetermined range so that the two signals respectively delivered by the filters are of essentially the same frequencies, and the phase shift networks 213 and 214 shift the phase of the input signals thereto, which alternate about a reference voltage, by 90° in each instance but in opposite directions so that the two output signals are approximately 180° out of phase. The multiplier 215 delivers on the output line 216 a produce waveform the factors of which constitute the input signal waveforms delivered to the multiplier from the phase shift networks 213 and 214. Evidently, such product output waveform will be zero when either of the factor waveforms is zero, it will be negative when either of such factor waveforms is of negative value, and it will be positive whenever the two factor signals are both positive or both negative. As noted hereinbefore, the correlation procedures and apparatus employed herein may be substantially the same as those disclosed in copending Patent application, Ser. No. 394,502, and in this respect the function of the correlator section 210 and the components comprising the same are analogous to the video module 346 illustrated in FIG. 19 of such application. Accordingly, further details of the filters, phase shift networks, and multiplier will not be set forth.

The analyzer section of the unit 44 includes the *x* and *y* reference channels which are symmetrically related to the correlator section 210 in the FIG. 8 illustration. It is seen in this Figure that the *x* timing reference input signal is derived from the raster generator 51 and is a replica of the waveform in the *x* deflection system of the flying spot scanner 31. Since the coordinate position of the scanning spot in the raster of the phototube 31 is at any instant substantially a linear function of the *x* and *y* scanning waveforms, the *x* and *y* reference signals on the lines 73 and 70 respectively represent the instantaneous position of the scanning spot in a cartesian coordinate system having its origin at the center of the raster. Consequently, the sign and amplitude of the *x* reference signals on the input line 73 specify the position of the scanning spot within the scanning raster in the *x* coordinate direction. Correspondingly, the sign and amplitude of the y reference signal on the input line 70 specify the position of the scanning spot within the scanning raster in the y coordinate direction.

As indicated in FIG. 8, the signals appearing on the lines 73 and 70 have twice the frequency of the x and y scanning signals and, accordingly, are denoted as 2X deflection reference signals and 2Y deflection reference signals. Signals of such higher frequencies are used because they increase the accuracy and stability of the output correction signals appearing on the lines 46, 47 and 48, and it will be noted, these higher frequency signals are reduced to the scanning signal frequency before being finally used.

Returning to FIG. 8, the 2X deflection reference signal on the line 73 is seen to be fed to a delay line 217 which delivers at the output signal line 218 therefrom a delayed replica of the 2X reference signal waveform. Similarly, the 2Y deflection reference signal on the line 70 is fed to a delay line 219 which delivers at the output signal line 220 a delayed replica of the 2Y reference signal waveform. The purpose of the delay lines 217 and 219 is to compensate the timing reference signals for delays in the video signals which occur in the video amplifiers 42 and 43; and as a result of the functioning of the delay lines 217 and 219 the reference signals appearing on the lines 218 and 220 represent accurately in point of time the position of the scanning spot giving rise to any misregistration information appearing on the output signal line 216 from the correlator section 210.

The x reference signal on the line 218 is fed to a dividing circuit 211 which divides the frequency of such input signal thereto by two, whereupon the reference signal appearing on the output line 222 from the divide-by-two circuit 211 has the same frequency as the x scanning signal. The signal line 222 constitutes one of the inputs to a multiplier 223 the output of which provides the aforementioned x correction signal appearing on the line 46. Also as seen in FIG. 8, the output signal line 218 from the delay line 217 is connected to and constitutes the input to an inverter 224 the output of which appears on a line 225 forming the input to another divide-by-two circuit 221, the output of which is fed by a signal line 227 to a multiplier 228. The output signal from the multiplier 228 appears on a line 229 connected to a summation point 230 along the aforementioned correction signal line 48.

Evidently, in view of the two divided-by-two circuits 221 and 226, the signal appearing on the line 277 has substantially the same frequency as the signal appearing on the line 222 (i.e., the frequency of the x scanning signal) but is inverted or substantially 180° out of phase with respect thereto. The two networks respectively constituting the divide-by-two circuit 221 and multiplier 223, and the inverter 224, divide-by-two circuit 226 and multiplier 228 are maintained in enforced time synchronism by a synchronizing signal in the form of the x deflection reference or x scanning signal delivered to each of the divide-by-two circuits 221 and 226 from the signal line 74.

A completely corresponding and analogous arrangement is provided in the y reference channel and, accordingly, the output signal line 220 from the delay line 219 delivers the signal thereon to a divide-by-two circuit 229 the output of which is fed by a signal line 230 to a multiplier 231 the output of which provides the aforementioned y correction signal appearing on the line 47. The signal line 220 is also connected to an inverter 232 having an output signal line 233 connected to the input of a divide-by-two circuit 234 which delivers its output signal via a line 235 to a multiplier 236 the output of which is connected by a signal line 237 to the aforementioned summation point 230. Accordingly the output signal waveforms from the multipliers 228 and 236 are added algebraically at the summation point 230, and the resultant signal appears on the line 48 as the θ correction signal.

Each of the multipliers 223, 228, 231 and 236 necessarily has two input signals, and with respect to the multipliers 223 and 231, the second input signal to each constitutes the output signal appearing on the line 216 from the correlator section 210. With respect to the multiplier 228 the second input signal thereto is the y correction signal output from the multiplier 231; and with respect to the multiplier 236 the second input signal thereto is the x correction signal output from the multiplier 223.

As heretofore stated, the analyzer section of the unit 44 is analogous to the analyzer components of the correlator shown in FIG. 19 of the aforementioned Patent application, Ser. No. 394,502 with the delay lines 217 and 219 being of conventional form such as the lumped-constant low pass delay lines 385 and 387 shown therein, with the multipliers 223, 228, 236 and 231 being analogous to the analyzer modules 438 and 439 shown in FIG. 19 of such application, and with the inverters 224 and 232 being substantially the same as the inverter 192 shown in FIG. 15 of such Patent application. The divide-by-two circuits 221, 226, 234 and 229 may be the same as the divide-by-two circuits described heretofore in connection with the raster generator 51 shown in FIG. 4. Accordingly further details of the various analyzer components will not be specified.

ZOOM CONTROL CIRCUIT

Figure 10:
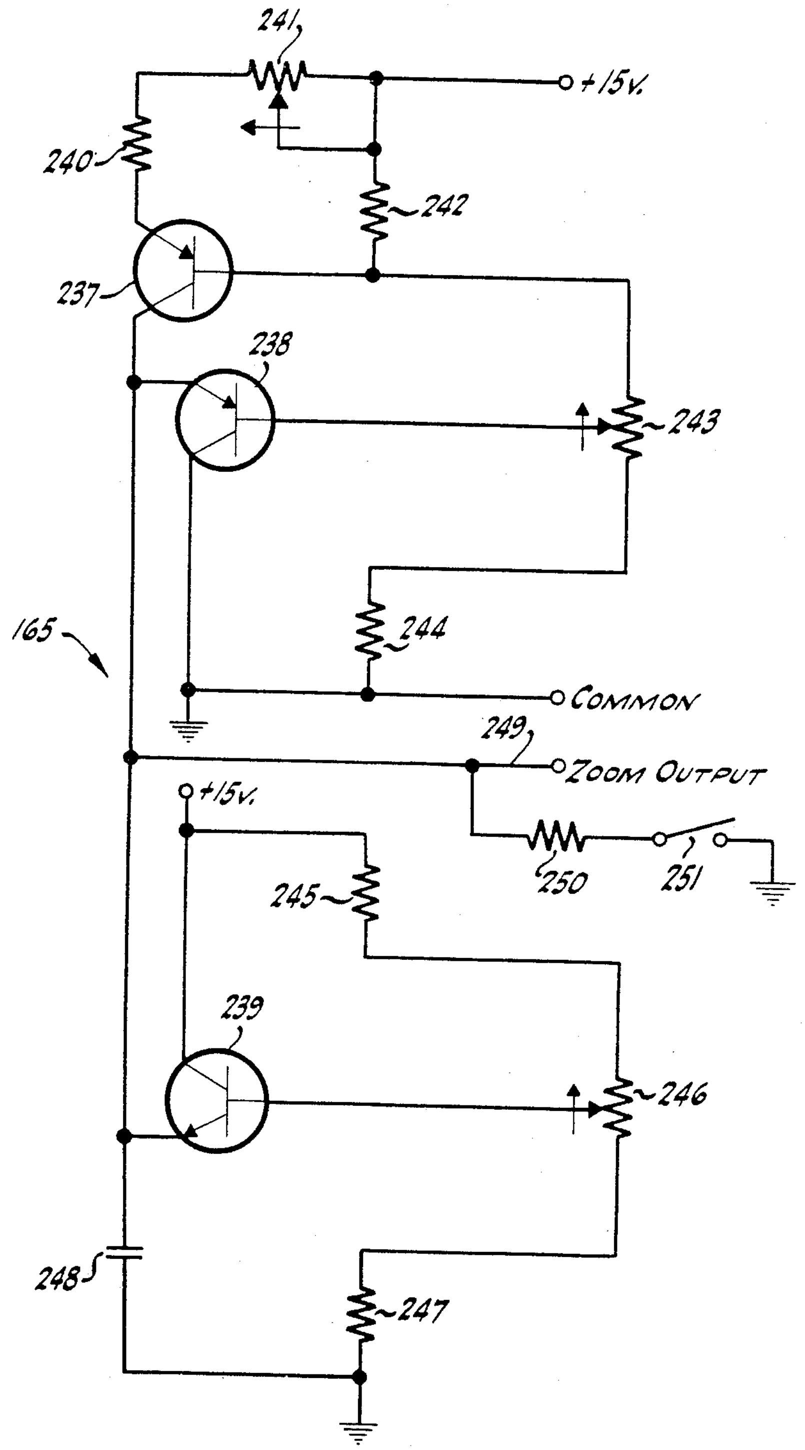
FIG. 10 is a schematic circuit diagram of the zoom control circuit.

The zoom control circuit is illustrated in FIG. 10 and is seen to comprise a plurality of transistors respectively denoted with the numerals 237, 238 and 239. The emitter element of the transistors 237 is connected to the positive 15 volt supply through a resistance 240 and potentiometer 241, the latter of which is used to adjust the biasing current of the transistor 237 and thereby controls the slope or rate of potential rise of a voltage ramp constituting the output of the zoom control circuit. A voltage divider network which includes a series related resistance 242, potentiometer 243 and resistance 244 is connected between ground and the positive 15 volt supply, and the base elements of the transistors 237 and 238 are connected to such voltage divider. In this respect, the adjustable contact or wiper of the potentiometer 243 is connected to the base of the transistor 238 and is used to vary the starting point or initial potential of the output voltage ramp.

A similar voltage divider network comprising a series related resistance 245, potentiometer 246 and resistance 247 is connected between ground and the positive 15 volt supply, and the adjustable contact or wiper of the potentiometer 246 is connected to the base of the transistor 238 and is used to vary the final or terminal potential of the output voltage ramp. A capacitance 248 is included in the circuit and it is connected between ground and the collector element of the transistor 237 so as to be fed thereby. The output signal line of the zoom control circuit is denoted with the numeral 249 and is connected to the juncture of the capacitance 248 and collector element of the transistor 237. The signal line 249 is also connected to ground through a resistance 250 and switch 251.

Figure 9:
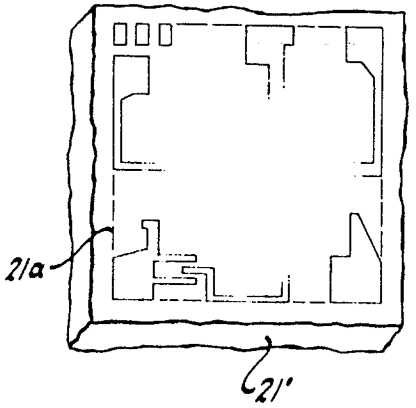
FIG. 9 is a perspective view illustrating a semiconductor in the form of an integrated circuit component.

The transistor 237 constitutes a constant current generator operative to charge the capacitance 248 which charge thereon produces the voltage ramp at the output line 249. The transistors 238 and 239 are limiting transistors which respectively determine the starting and ending potentials of the voltage ramp, which potentials can be selectively varied through adjustment of the potentiometers 243 and 246. The extent of the voltage ramp establishes the size of the area scanned by the flying spot scanner 31; and in a typical situation, the potentiometer 246 is adjusted to provide a voltage ramp such that the initial area of the object 21 inspected by the flying spot scanner 31 will be about four times the total area of such object where the object is a semiconductor element. In the same situation, the potentiometer 243 is adjusted so that the smallest and final area of the semiconductor inspected by the flying spot scanner 31 encompasses substantially the entire metallized area thereof which, in the FIG. 9 illustration, essentially constitutes the area 21a. The potentiometer 241, as previously noted, permits adjustment of the rate or slope of the voltage ramp, and the switch 251 is used to turn the ramp on and off. The output signal line 249 is connected to the x and y deflection amplifiers for the flying spot scanner tube 31, and such connection with the $x$ deflection amplifier 53 is indicated in FIG. 6.

In operation of the zoom control circuit, when an object 21 such as a semiconductor is positioned by the component-advancing mechanism 18 in general alignment with the inspection module 15, the switch 251 is closed, which closing thereof serves to clamp or fix the output appearing on the signal line 249 at its most negative level being, in an exemplary instance, approximately 0.6 volts negative with respect to the potential appearing on the adjustable contact (i.e., the base element of the transistor 239) of the potentiometer 246. The servo unit 45 is then actuated and the switch 251 opened, which opening thereof may occur substantially simultaneously with the actuation of the servo unit or slightly thereafter. The capacitance 248 is then charged by the constant current generator comprising the transistor 237, and such charging of the capacitance produces the aforementioned voltage ramp at the output signal line 249.

When the slope of the voltage ramp reaches a value of approximately 0.4 volts positive with respect to the potential on the movable contact (i.e., the base element of the transistor 238) of the potentiometer 243, the transistor 238 begins to conduct and thereby prevents the ramp voltage from rising to a greater value. The transistor 238 may be a germanium transistor selected to have a large base-to-emitter breakdown voltage. Evidently, the voltage ramp potentials appearing on the output signal line 249 are fed to the deflection amplifiers 52 and 53 as indicated in FIG. 6. The progressively changing voltage output of the zoom control circuit will alter the outputs of the deflection amplifiers 52 and 53 for the flying spot scanner 31 to progressively change the area traversed by the moving spot thereof between the aforementioned larger initial and smaller final scanning areas.

SUMMARY

The detailed functioning of the various components of the alignment system with respect to an overall operational cycle thereof is evident from the foregoing discussion and need not be repeated. Thus, in summary it may be said only that the system is operative to compare an object scene with a reference standard, and in response to any deviation therebetween from a preestablished relative disposition, the condition of alignment between the object scene and a work implement used or otherwise associated therewith is correctively changed toward a desired condition of accurate alignment. Evidently, the work implement bears a predetermined relationship with respect to either the reference standard or the object scene, and in the specific embodiment of the invention considered in detail herein, such relationship of the implement is with the reference standard and is a fixed positional relationship because of the structural interconnection of the inspection module 15, which carries the reference standard, and the wire feeder 23, which defines the work implement (or carries the same if the lead wire be considered to be the implement), as shown in FIG. 1 and described hereinbefore. In this particular embodiment of the invention, the wire feeder 23 is displaced with respect to the object scene 21 as a consequence of the functioning of the servo unit 45, and the inspection module 15 therefore moves with the wire feeder during displacements thereof.

In correcting any misalignment, comparative indicia is obtained from the object scene and reference standard from which the position of the object scene with respect to the reference standard can be ascertained; and from such indicia is derived correction information indicative of any misalignment between the object scene and reference standard. If misalignment is determined to exist, correction information is supplied which causes corrective relative movement between the object scene and work implement to establish the desired condition of alignment therebetween. In the specific embodiment being considered, the reference standard and object scene are scanned concurrently to provide the comparative indicia from which the relative positions can be ascertained; and the reference standard is a photographic transparency although, as indicated hereinbefore, a wide variety of reference standards can be employed including a physical object constituting an effective "master" of the object scene.

The inspection system is a variable field mechanism in that it has a large acquisition range convertible into a reduced or restricted range for the purpose of close inspection of an object scene and reference standard to effect the desired condition of accurate alignment. Such variable field feature is due in significant part to the zoom control circuitry which enables the scanning area traversed by the flying spot scanner 31 to be altered selectively from a large area used for acquisition purposes to a reduced area employed for accurate alignment. The scanning system employed in the particular mechanism under consideration includes a flying spot scanner and multiplier phototube, but as previously noted other scanning systems could be used, and in certain instances the scanning system might be responsive to and utilize energy other than that within the visible or light spectrum.

Drift in a scanning device is an inherent characteristic of any scanning system (an example of drift being shifts or slight displacements in the raster of a flying spot scanner tube such as those caused by stray magnetic fields and/or thermal expansion of the various elements of the tube) and usually requires the inclusion of drift stabilization circuitry in any multiple-scanner system where accuracy in the scanning function is necessary. In the present alignment system, both the object scene 21 and the reference standard 40 are scanned with a single flying spot scanner 31 which is an exceedingly advantageous feature in that it provides the system with freedom from positional error due to drift without introducing the complexities of stabilization circuitry. Accordingly, in the present alignment system so long as the two optical axes which are defined in one instance by the flying spot scanner 31 and objective lens 32 focusing the scanning beam onto the object scene 21, and in the other instance by the flying spot scanner 31 and objective lens 39 focusing the scanning beam onto the reference standard 40, remain in a fixed relative disposition, no positional errors are introduced into the system because of drift in the scanner 31; and, quite evidently, such optical axes are fixedly related in the present system.

In certain environmental uses of the invention it may be desirable to connect two or more lead wires to a semiconductor without changing the reference standard 40 or otherwise interceding in the operation of the apparatus as disclosed. In this respect take, for example, the case in which a semiconductor defining the object scene is a transistor requiring the connection of separate lead wires to the base and emitter elements thereof, one reference standard 40 and multiplier phototube 41 can be provided as shown in FIG. 2 for controlling the connection of a lead wire to one of the elements and a second reference standard and multiplier phototube therefor can be provided for controlling the connection of a lead wire to the other such element.

In addition to the second reference standard and associated multiplier phototube, the apparatus would conveniently include a beam splitter interposed between the objective lens 30 and the two reference standards in a manner such that two optical paths of substantially equal lengths are provided from the lens 30 to the two reference standards; and the apparatus would further conveniently include an additional video amplifier for such additional multiplier phototube, and a switching arrangement, such as a relay, connected in the output circuits of the two video amplifiers respectively associated with the two reference standards to enable one or the other of the amplified video outputs represented thereby to be connected to the correlator and analyzer unit 44 and thereby condition the alignment system to be selectively responsive to one or the other of the reference standards. With the embodiment specifically illustrated and described herein, a semiconductor requiring the connection of a plurality of lead wires to various elements thereof might be advanced progressively through a succession of stations each being defined by an alignment system operative to attach a lead wire to a particular preselected or preprogramed element of the semiconductor.

Sometimes herein the terms "energy or optical sensor" are used which terms include the multiplier phototube (a specific example of such tubes being an Amperex XP1110), and the term "raster-size control network" is used to include the zoom control circuit. Although various flying spot scanner tubes and viewing monitor tubes can be used specific examples thereof are a National Union NU142P16 and a Waterman 3ACP31, respectively.

For purposes of presenting a specific example of component values in typically illustrative circuits, the following may be considered:

Raster Generator illustrated in FIG. 4

| | | |
|---|---|---|
| transistor | 78 | 2N 3565 |
| resistance | 79 | 1.2 kΩ |
| transformer | 80 | 16 turns |
| | 81 | No. 34 wire |
| | 82 | 50 turns |
| capacitance | 83 | 3,300 picofarads |
| resistance | 84 | 10 kΩ |
| resistance | 85 | 5.1 kΩ |
| capacitance | 86 | 0.01 microfarads |
| resistance | 87 | 100 ohms |
| capacitance | 88 | 2.2 microfarads |
| integrated circuit | 89 | LU 332 |
| capacitance | 90 | 0.0047 microfarads |
| capacitance | 92 | 33 picofarads |
| resistance | 94 | 4.7 kΩ |
| resistance | 95 | 4.7 kΩ |
| resistance | 96 | 4.7 kΩ |
| resistance | 97 | 4.7 kΩ |
| resistance | 98 | 1.0 kΩ |
| capacitance | 99 | 47 picofarads |
| integrated circuits | 110–113 | LU 320 |
| integrated circuits | 114–115 | LU 332 |
| capacitance | 116 | 47 picofarads |
| capacitance | 117 | 47 picofarads |
| resistance | 118 | 4.7 kΩ |
| resistance | 119 | 4.7 kΩ |
| resistance | 120 | 4.7 kΩ |
| resistance | 121 | 4.7 kΩ |
| capacitance | 123 | 100 picofarads |
| capacitance | 124 | 100 picofarads |
| diode | 125 | FD 6193 |
| diode | 126 | FD 6193 |
| resistance | 127 | 1 kΩ |
| capacitance | 129 | 100 picofarads |
| capacitance | 131 | 100 picofarads |
| resistance | 132 | 4.7 kΩ |
| resistance | 133 | 4.7 kΩ |
| capacitance | 135 | 100 picofarads |
| resistance | 136 | 4.7 kΩ |

Deflection Amplifier illustrated in FIG. 5

| | | |
|---|---|---|
| transistor | 137 | 2N3638A |
| transistor | 138 | 2N3638A |
| capacitance | 141 | 4.7 microfarads |
| capacitance | 142 | 4.7 microfarads |
| transistors | 143*a* and *b* | 2N 3440 |
| transistors | 145*a* and *b* | 2N 3440 |
| capacitances | 146*a* and *b* | 0.1 microfarads |
| resistances | 147*a* and *b* | 150 kΩ |
| resistances | 147*a* and *b* | 150 kΩ |
| resistances | 148*a* and *b* | 2.7 kΩ |
| resistances | 149*a* and *b* | 39 kΩ |
| resistances | 150*a* and *b* | 82 kΩ |
| resistances | 151*a* and *b* | 300 kΩ |
| resistances | 152*a* and *b* | 100 kΩ |
| capacitances | 153*a* and *b* | 0.0015 microfarads |
| capacitances | 154*a* and *b* | 0.01 microfarads |
| resistance | 155 | 10 kΩ |
| resistance | 156 | 10 kΩ |
| resistance | 157 | 9.1 kΩohms |
| resistance | 158 | 3.9 kΩ |
| resistance | 159 | 2.0 kΩ |
| transistor | 160 | 2N 3638A |
| resistance | 161 | 8.2 kΩ |
| potentiometer | 162 | 50 kΩ |

Reflection Amplifier illustrated in FIG. 6

| | | |
|---|---|---|
| resistance | 163 | 13 kΩ |
| resistance | 164 | 2.0 kΩ |
| transistor | 137' | 2N 3638A |
| transistor | 138' | 2N 3638A |
| transistor | 160' | 2N 3638A |
| resistance | 161' | 8.2 kΩ |
| potentiometer | 162' | 50 kΩ |

Video Amplifier illustrated in FIG. 7

| | | |
|---|---|---|
| multiplier phototube | 32 | |
| resistance | 169 | 100 kΩ |
| resistance | 171 | 240 kΩ |
| resistances | 172 | 330 kΩ |
| resistance | 173 | 470 kΩ |
| capacitance | 174 | 0.05 microfarads |
| capacitance | 175 | 0.05 microfarads |
| capacitance | 176 | 0.0033 microfarads |
| transistor | 177 | 2N 3565 |
| resistance | 178 | 10 kΩ |
| transistor | 179 | 2N 3565 |
| transistor | 180 | 2N 3565 |
| resistance | 181 | 12 kΩ |
| resistance | 182 | 2.7 kΩ |
| transformers | 183 | 400 turns |
| | 184 | No. 38 wire |
| | 185 | 130 turns |
| | 186*a* and *b* | 130 turns |
| resistance | 189 | 10 kΩ |
| resistance | 190 | 100 ohms |
| resistance | 191 | 1.0 kΩ |
| capacitance | 192 | 4.7 microfarads |
| resistance | 193 | 2.7 M ohms |
| capacitance | 194 | 4.7 microfarads |
| resistance | 195 | 68 kΩ |
| capacitance | 196 | 4.7 microfarads |
| resistance | 197 | 120 kΩ |
| resistance | 198 | 100 kΩ |
| resistance | 199 | 3.3 kΩ |
| capacitance | 200 | 15 picofarads |
| transistors | 202*a* and *b* | 2N 3439 |
| diodes | 203*a* and *b* | FD 6193 |
| diodes | 204*a* and *b* | FD 6193 |
| capacitances | 205*a* and *b* | 33 picofarads |
| Zener diodes | 206*a* and *b* | UZ 232 |
| resistances | 207*a* and *b* | 22 M ohms |
| resistance | 208 | 33 kΩ |

Zoom Control Circuit illustrated in FIG. 10

| | | |
|---|---|---|
| transistor | 237 | 2N3638A |
| transistor | 238 | 2N1307 |
| transistor | 239 | 2N3565 |
| resistance | 240 | 1.5 kΩ |
| potentiometer | 241 | 20 kΩ |
| resistance | 242 | 2.0 kΩ |
| potentiometer | 243 | 5.0 kΩ |
| resistance | 244 | 8.06 kΩ |
| resistance | 245 | 3.01 kΩ |
| potentiometer | 246 | 5.0 kΩ |
| resistance | 247 | 6.98 kΩ |
| capacitance | 248 | 100 microfarads |
| resistance | 250 | 1.0 kΩ |

It should be appreciated that the specific circuit values set forth imply no criticality and can be varied greatly depending upon internal and external parameters, the choice of transistors, the specific function intended for the circuit in any environmental setting, etc.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. In a method of utilizing a reference standard to effect a predetermined condition of alignment between a particular area of an object scene and a work implement, the steps of:

a. scanning a relatively large area of the object scene and scanning a comparable large area of the reference standard to obtain comparative indicia from which the position of the object scene relative to the reference standard is ascertained;

b. effecting on the basis of such comparative indicia relative movement between the object scene and work implement so as to effect more close alignment therebetween;

c. scanning progressively smaller areas within said relatively large area of the object scene and scanning comparably smaller areas of the large area of the reference standard at a predetermined rate to obtain with each scan of a progressively smaller area of the object scene and comparably smaller area of the reference standard further comparative indicia from which the position of the object scene relative to the reference standard is more accurately ascertained; and, after each scan of a progressively smaller area of the object scene and comparably smaller area of the reference standard d. effecting on the basis of said further comparative indicia relative movement between the object scene and work implement until said further comparative indicia indicates that said predetermined condition of alignment is met.

2. The method of claim 1, in which said predetermined rate in reduction in size of the scan area generally approximates the rate at which relative movement is effected between the object scene scene and the work implement toward such condition of predetermined alignment.

3. The method of claim 2 in which said object scene is a semiconductor provided with a lead-connection area thereon and said work implement comprises a lead-connector mechanism, the aforesaid predetermined condition of alignment being one in which the lead-connecting component of said mechanism is in alignment with said lead-connection area.

4. The method of claim 3 wherein said relatively large area is the surface of the semiconductor while the smallest area is the lead connection area of the semiconductor.

5. The method of claim 3 in which said lead-connector mechanism is fixedly related to said reference standard to define said preestablished relationship with the work implement relative to the reference standard.

6. The method of claim 1 in which said work implement is moved to effect said predetermined condition of alignment.

7. The method of claim 1 in which said object scene and reference standard are scanned simultaneously from the same scanning source.

8. The method of claim 1 in which the object scene and the reference standard are scanned to obtain separate electronic signals indicative of the optical characteristics of each.

9. The method of claim 8 including the step of comparing the electronic signals of the object scene and the electronic signals of the reference standard to obtain said comparative indicia, and the further step of comparing the electronic signals of said object scene and the electronic signals of said reference standard for each progressive scan to obtain said further comparative indicia.

10. The method of claim 8 in which said object scene and said reference standard are scanned with a light beam to obtain optical signals indicative of the configuration of the object scene and of the reference standard, and including the steps of translating said optical signal from the object scene into an electrical signal and translating said optical signal from the reference standard into an electrical signal.

11. The method of claim 10 including the step of comparing the electronic signals of the object scene and the electronic signals of the reference standard to obtain said comparative indicia, and the further step of comparing the electronic signals of said object scene and the electronic signals of said reference standard for each progressive scan to obtain said further comparable indicia.

12. The method of claim 10 wherein said reference standard is a photographic transparency.

13. The method of claim 10 in which said object scene and reference standard are scanned from a single scanning light source.

14. The method of claim 13 in which said light beam is provided by a flying spot scanner, and in which the step of scanning said object scene and said reference standard includes controlling the flying spot of such scanner so as to impinge concurrently upon both said object scene and said reference standard.

15. The method of claim 10 in which the steps of translating the optical signals into electrical signals includes provision of a pair of optical sensors respectively associated with the object scene and reference standard to receive the optical signals transmitted thereto whereby the electrical signals are video signals constituting the outputs of the optical sensors.

16. The method of claim 1 including the step of producing from said comparative indicia and said further comparative indicia, electrical correction signals by means of which the relative movement between the object scene and the work implement are effected.

17. The method of claim 16 including the step of converting said correction signals into physical displacements enforced upon at least one of said object scene and said work implement to obtain said predetermined condition of alignment.

18. The method of claim 17 in which said predetermined condition of alignment is effected by physical displacement of the work implement with respect to the object scene.

19. In an apparatus for effecting a predetermined condition of alignment from a reference standard between a particular area of an object scene and a work implement the combination of:

a. scanning means for scanning a selected area of the object scene and scanning a corresponding area of the reference standard;

b. generating means coupled to said scanning means for generating comparative indicia from which the position of the object scene relative to the reference standard is ascertained;

c. movement means for effecting on the basis of such comparative indicia relative movement between the object scene and work implement; and d. zoom control means coupled to said scanning means for progressively decreasing the scanned area at a predetermined rate until said comparative indicia indicates that said predetermined condition of alignment is met; wherein e. said movement means effects relative movement between the object scene and the work implement in accordance with the comparative indicia generated by said generating means after each progressive scan controlled by said zoom control means until said comparative indicia indicates that said predetermined condition of alignment is met.

20. The apparatus of claim 19 in which said scanning means includes:

a single flying spot source and components for directing the scanning energy generated thereat simultaneously toward said object scene and said reference standard, and means for providing from said scanning energy said comparative indicia, and in which said effecting means includes:

a correlator and analyzer unit for deriving correction information from said comparative indicia and said further comparative indicia, and displacement error correction means for effecting in response to said correction information the relative movement between the object scene and the work implement.

21. The apparatus of claim 20 in which the reference standard comprises a photographic transparency.

22. The apparatus of claim 20 in which said scanning means further includes a pair of scanning energy sensors respectively associated with the object scene and reference standard for receiving the scanning energy modulated thereby.

23. The apparatus of claim 20 in which said scanning means further includes a pair of optical sensors respectively associated with object scene and reference standard and being operative to provide video output signals constituting the aforesaid comparative indicia and further comparative indicia and in which said correlator and analyzer unit is operative to correlate said video output signals to derive error signals therefrom indicative of any misalignment between the object scene and reference standard and further operative to develop from such error signals correction signals constituting the aforesaid correction information.

24. The apparatus of claim 23 including a servo unit connected to said work implement to impart physical displacements thereto relative to the object scene.

25. An apparatus utilizing a reference standard for effecting a predetermined condition of alignment between a lead connection area on a semiconductor and a lead connector mechanism operative to connect a lead wire to such connection area comprising:

a. a work holder structure for supporting such semiconductor in operative association with the lead connector mechanism, b. a scanning system including a single flying spot scanner for scanning concurrently such semiconductor and reference standard, c. a raster generator connected with said flying spot scanner for developing the scanning raster therefrom, d. a raster size control network connected in the deflection circuit of said flying spot scanner for reducing the size of the scanning raster from a relatively large area including a major area of such semiconductor toward a smaller lead connection area thereon so as to increase the accuracy of alignment of the lead connector mechanism therewith, e. means for progressively changing the size of such raster from the relatively large area toward the smaller lead connection area, f. a pair of optical sensors respectively associated with such semiconductor and reference standard for receiving the scanning light modulated by such semiconductor and reference standard whereby the outputs of said optical sensors constitute video signals providing comparative indicia of the position of the semiconductor elative to the reference standard, and g. a correlator and analyzer unit comprising
means for correlating such video signals and deriving therefrom electrical error signals of any misalignment between such semiconductor and reference standard,
means for developing from such error signals correction signals from which relative displacements between the semiconductor and lead connector mechanism can be made toward such predetermined condition of alignment, and
displacement error correction means for effecting in response to such correction signals relative movement between such semiconductor and lead connector mechanism as necessary to obtain the aforesaid condition of alignment therebetween.

26. The apparatus of claim 25 in which said progressive change in raster size is continuous and in which said raster size control network includes means for selectively adjusting the rate of such continuous change in raster size from the larger to the smaller area.

27. The apparatus of claim 25 in which the correction signals developed by said correlator and analyzer unit include X, Y and $\theta$ signal components, where X and Y are the axes of a rectangular coordinate system and $\theta$ represents rotation constituting an algebraic addition with the X and Y signal components and in which said displacement error correction means comprises a servo unit responsive to correction signal components for imparting displacement between such semiconductor and lead connector mechanism.

28. The apparatus of claim 27 in which said servo unit is connected with said lead connector mechanism for imparting displacement thereto.

29. The apparatus of claim 28 and further including a cathode-ray tube defining a viewing monitor with a deflection system, the deflection system of said viewing monitor being connected with said raster generator, and its video signal input being connected with said optical sensors.

* * * * *